US012091253B2

(12) United States Patent  (10) Patent No.: US 12,091,253 B2
Lynch et al.  (45) Date of Patent: Sep. 17, 2024

(54) AUTOMATED STORAGE AND RETRIEVAL SYSTEM WITH DETECTOR FOR DETECTING ITEMS EXTENDING BEYOND DIMENSIONAL THRESHOLD

(71) Applicant: Opex Corporation, Moorestown, NJ (US)

(72) Inventors: Christopher Lynch, Philadelphia, PA (US); Alexander Stevens, Philadelphia, PA (US); Robert R. DeWitt, Marlton, NJ (US); William L. Heins, III, Medford, NJ (US)

(73) Assignee: OPEX Corporation, Moorestown, NJ (US)

( * ) Notice: Subject to any disclaimer, the term of this patent is extended or adjusted under 35 U.S.C. 154(b) by 96 days.

(21) Appl. No.: 17/709,342

(22) Filed: Mar. 30, 2022

(65) Prior Publication Data

US 2022/0324650 A1  Oct. 13, 2022

Related U.S. Application Data

(63) Continuation of application No. 16/743,534, filed on Jan. 15, 2020, now Pat. No. 11,319,149, which is a
(Continued)

(51) Int. Cl.
*G06F 7/00* (2006.01)
*B65G 1/00* (2006.01)
(Continued)

(52) U.S. Cl.
CPC .............. *B65G 1/137* (2013.01); *B65G 1/00* (2013.01); *B65G 1/133* (2013.01);
(Continued)

(58) Field of Classification Search
CPC .......... B65G 1/137; B65G 1/00; B65G 1/133; B65G 2203/02; B65G 2203/04; G01B 11/02
(Continued)

(56) References Cited

U.S. PATENT DOCUMENTS 3,323,661 A  6/1967  Chasar
3,372,816 A  3/1968  Atwater
(Continued)

FOREIGN PATENT DOCUMENTS

AU  2014216046  9/2014
CA  2872496  10/2013
(Continued)

OTHER PUBLICATIONS

Examination Report issued from China for Chinese Application No. 2017800618010 on Oct. 19, 2021.
(Continued)

*Primary Examiner* — Yolanda R Cumbess
(74) *Attorney, Agent, or Firm* — Brian Dinicola

(57) ABSTRACT

A method and apparatus are provided for sorting or retrieving items to/from a plurality of destinations areas. The items are loaded onto one of a plurality of independently controlled delivery vehicles. The delivery vehicles follow a path to/from the destination areas that are positioned along the path. Along the path, the vehicles are scanned to determine if any item on the vehicles extends beyond a dimensional constraint. If it is determined that an item on a vehicle extends above the pre-determined threshold, the vehicle is controlled, such as by stopping or re-directing the vehicle. Once at the appropriate destination area, an item is transferred between the delivery vehicle and the destination area.

16 Claims, 15 Drawing Sheets

Related U.S. Application Data continuation of application No. 15/668,380, filed on Aug. 3, 2017, now Pat. No. 10,589,930.

(60) Provisional application No. 62/370,912, filed on Aug. 4, 2016.

(51) Int. Cl.
  *B65G 1/133* (2006.01)
  *B65G 1/137* (2006.01)
  *G01B 11/02* (2006.01)

(52) U.S. Cl.
  CPC ...... *B65G 2203/02* (2013.01); *B65G 2203/04* (2013.01); *G01B 11/02* (2013.01)

(58) Field of Classification Search
  USPC ................................ 700/213–214, 218, 228
  See application file for complete search history.

(56) References Cited

U.S. PATENT DOCUMENTS

| 9,299,013 | B1 | 3/2016 | Curlander et al. |
|---|---|---|---|
| 2013/0275045 | A1 | 10/2013 | Tsujimoto |
| 2014/0031972 | A1 | 1/2014 | DeWitt et al. |
| 2015/0353282 | A1 | 12/2015 | Mansfield |
| 2015/0353828 | A1 | 12/2015 | Wang et al. |
| 2015/0375947 | A1 | 12/2015 | Hochstein et al. |
| 2016/0171892 | A1 | 6/2016 | Gieseke |
| 2016/0221757 | A1 | 8/2016 | DeWitt et al. |
| 2016/0288330 | A1 | 10/2016 | Konolige |
| 2016/0327383 | A1 | 11/2016 | Becker |
| 2017/0074652 | A1 | 3/2017 | Send |
| 2017/0183155 | A1 | 6/2017 | Kazama |
| 2017/0260008 | A1* | 9/2017 | DeWitt .................. B65G 43/08 |
| 2017/0369246 | A1 | 12/2017 | DeWitt et al. |
| 2018/0037412 | A1 | 2/2018 | Lynch |
| 2018/0143003 | A1 | 5/2018 | Clayton |
| 2018/0346247 | A1 | 12/2018 | DeWitt et al. |
| 2020/0148475 | A1 | 5/2020 | Lynch |
| 2022/0051179 | A1* | 2/2022 | Savvides ................ G06F 16/583 |

FOREIGN PATENT DOCUMENTS

| CN | 102405394 | 4/2012 |
|---|---|---|
| CN | 105235913 | 1/2016 |
| DE | 44 11 884 | 10/1995 |
| DE | 198 35 033 | 11/1999 |
| DE | 10 2004 044 973 | 3/2006 |
| JP | 1987299701 | 6/1986 |
| JP | 1993072301 | 12/1991 |
| JP | 1997030614 | 7/1995 |
| JP | 1998012011 | 6/1996 |
| JP | 2013086891 | 10/2011 |
| JP | 201552249 | 3/2015 |
| JP | 20160606201 | 3/2015 |

OTHER PUBLICATIONS

International Search Report & Written Opinion issued in PCT/US17/45320 on Nov. 23, 2017.

Examination report issued in Australia for Application No. 2022252707 on Nov. 2, 2023.

Examination report issued in Japan for Application No. 2022-139751 on Nov. 29, 2023.

\* cited by examiner

AUTOMATED STORAGE AND RETRIEVAL SYSTEM WITH DETECTOR FOR DETECTING ITEMS EXTENDING BEYOND DIMENSIONAL THRESHOLD

PRIORITY

This application is a continuation of U.S. patent application Ser. No. 16/743,534, filed Jan. 15, 2020, which is a continuation of U.S. patent application Ser. No. 15/668,380 filed Aug. 3, 2017, now issued as U.S. Pat. No. 10,589,930. This application also claims the benefit of U.S. Provisional Patent Application Ser. No. 62/370,912 filed on Aug. 4, 2016. The entire disclosure of each of the foregoing patent applications is hereby incorporated herein by reference.

TECHNICAL FIELD

This disclosure relates to material handling systems for conveying one or more objects from a first location to a second location and, more particularly, to material handling systems in which one or more dimensional constraints are imposed along a conveying path.

BACKGROUND

Sorting and retrieving items to fill a customer order can be laborious and time consuming. Many large organizations have extensive storage areas in which numerous and diverse items are stored and/or from which they are retrieved. Sorting and retrieving items from the hundreds or thousands of storage areas requires significant labor to perform manually. In many fields, automated picking has developed to reduce labor cost and improve customer service by reducing the time it takes to fill a customer order. However, the known systems of automatically handling the materials are either very expensive or have limitations that hamper their effectiveness. Accordingly, there is a need in a variety of material handling applications for automatically storing and/or retrieving items.

By way of illustrative example, some automated systems utilize a conveying system that includes a plurality of independently operated vehicles. Problems arise in such conveying systems if items being conveyed by the vehicles overhang the edges of the vehicles or extend upwardly above a certain height.

Additionally, automated systems may include a picking station where a worker picks items from the vehicles. If a vehicle moves away from the station while the workers picking an item, damage to the item on injury to the operator may occur. Therefore, it is desirable to prevent a vehicle from advancing away from the picking station while the operator is picking an item.

SUMMARY OF THE INVENTION

In light of the foregoing, a system provides a method and apparatus for handling items. The system includes a plurality of storage locations or destination areas, and a plurality of delivery vehicles for delivering items to or retrieving items from the destination areas. The delivery vehicles follow paths to the destination areas.

According to one aspect, the present invention provides a material handling system having a plurality of destination areas, a plurality of vehicles, a controller and means for detecting whether an item on one of the vehicles extends beyond a predetermined dimensional threshold. According to one embodiment, the dimensional threshold may be the height above the vehicle.

The vehicles may be for delivering items to the destination areas or retrieving items from the destination areas.

The vehicles may travel along a path.

The controller may be operable to control movement of the plurality of vehicles.

The means for detecting may be positioned adjacent the path on which the vehicles travel.

The means for detecting may be operable to create a depth data set representative of a three-dimensional representation of a target area.

The controller may control operation of the vehicle in response to the means for detecting determining that an item projects beyond the dimensional threshold.

According to another aspect, the present invention provides material handling system having a plurality of destination areas, a plurality of vehicles and a detection assembly for detecting whether items extend beyond a predetermined dimensional threshold.

The detection assembly may be positioned adjacent the path on which the vehicles travel.

The detection assembly may include an emitter for projecting a light source onto one of the vehicles when the vehicle is at a location along the path.

The detection assembly may also include an imaging element configured to detect the light projected onto the vehicle.

The system may also include an image processor configured to receive image data from the detection assembly to determine the height that elements on the vehicle project above the vehicle.

The system may be configured to alter movement of the vehicles in response to the image processor determining that an item projects beyond the pre-determined dimensional threshold.

According to yet another aspect, the present invention provides a method for storing or retrieving items. The method includes the steps of controlling movement of vehicles to deliver items to destination areas or to retrieve items from the destination areas. The method also includes the step of detecting whether an item on one of the vehicles extends above a pre-determined dimensional threshold. According to one embodiment, the dimensional threshold may be the height above the vehicle.

The step of detecting may comprise the step of creating a depth data set representative of a three-dimensional representation of a target area.

The step of controlling the movement of the vehicles may comprise the step of controlling the vehicles in response to detecting that an item projects beyond the pre-determined dimensional threshold.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION

Figure 1:
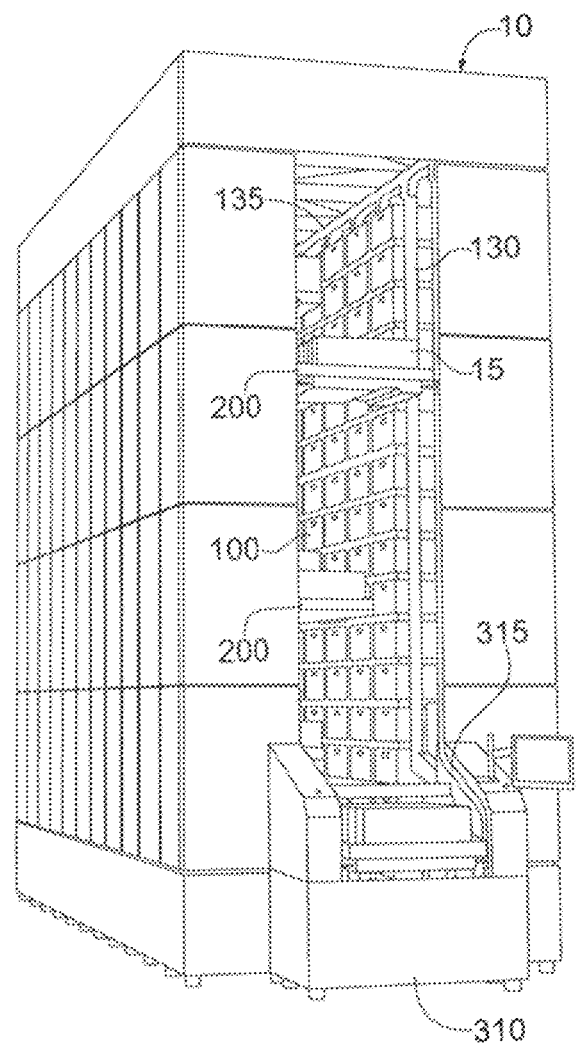
FIG. 1 is a perspective view of a sorting and retrieving apparatus.

Referring now to the figures in general and to FIG. 1 specifically, a material handling apparatus adapted to store and/or retrieve items is designated generally 10. The apparatus 10 includes a conveyor network for transporting items along a conveying path between a first location and a second location. In some embodiments consistent with the present disclosure, the first location is a storage location selectable from among a plurality of storage locations 100 and the second location is an article transfer station 310 where items may be picked, sorted and/or transferred from or to receptacles ("totes") 15. The conveyor network moves items (or totes which contain items) along the conveying path. A conveying network according to one or more embodiments may include one or more belt conveyor(s), one or more roller conveyor(s), and/or one or more article transporting appliances or vehicles adapted to grip, support, and/or move the items or totes along at least a portion of the conveying path and, optionally, into or out of the conveying path. At one or more points along the conveying path, there may be a dimensional constraint such as a maximum height and/or width clearance. Embodiments consistent with the present disclosure are directed to systems and methods for determining whether one or more dimensional constraints are satisfied, and for initiating appropriate action when, for example, an item or stack of items violates a dimensional constraint.

In some embodiments, the conveyor network includes a plurality of delivery vehicles or cars 200. The cars 200 are independently movable relative to one another, and each is arranged to deliver items to and/or retrieve items from, any of a plurality of storage locations 100 proximate the conveying path. One or more retrieved item(s) may be subsequently delivered, by any of the cars 200, to an article transfer station 310 for transfer from the car to an intermediate or final destination. Following a transfer of items, a car may return to a storage area to deliver, for storage, any items not transferred, at which point the car may advance to another storage area to obtain the next item(s) to be retrieved. In other embodiments consistent with the present disclosure, items being delivered to and/or from a storage location may be moved along at least some portions of the conveying path by another element of a conveyor network, such as a belt conveyor, a roller conveyor, or some other structure adapted to grip and/or support the items themselves or totes containing the items. Where the conveyor network includes vehicles 200, portions of the conveying path may be trackless. Alternatively, or in addition, all or part of the conveying path may comprise a track that guides the vehicles 200. For instance, the track may include horizontal track portions, such as horizontal track portion 135, and vertical track portions, such as vertical track portion 130, which collectively form a vertical loop as illustrated in FIGS. 8-12. However, it should be understood that the configuration of the track may vary depending on the application and as noted above, the system may guide the vehicles without the need of a track. For example, the vehicles may travel along the ground and the system may control the direction of travel for each vehicle along the ground independently to steer each vehicle along a designated path.

The track 110 illustrated in FIGS. 8-12 has a horizontal upper rail 135 and a horizontal lower rail 140, which operates as a return leg. A number of parallel vertical track legs 130 extend between the upper rail and the lower return leg. In the present instance, the storage areas 100 are arranged in columns between the vertical track legs 130.

Figure 8:
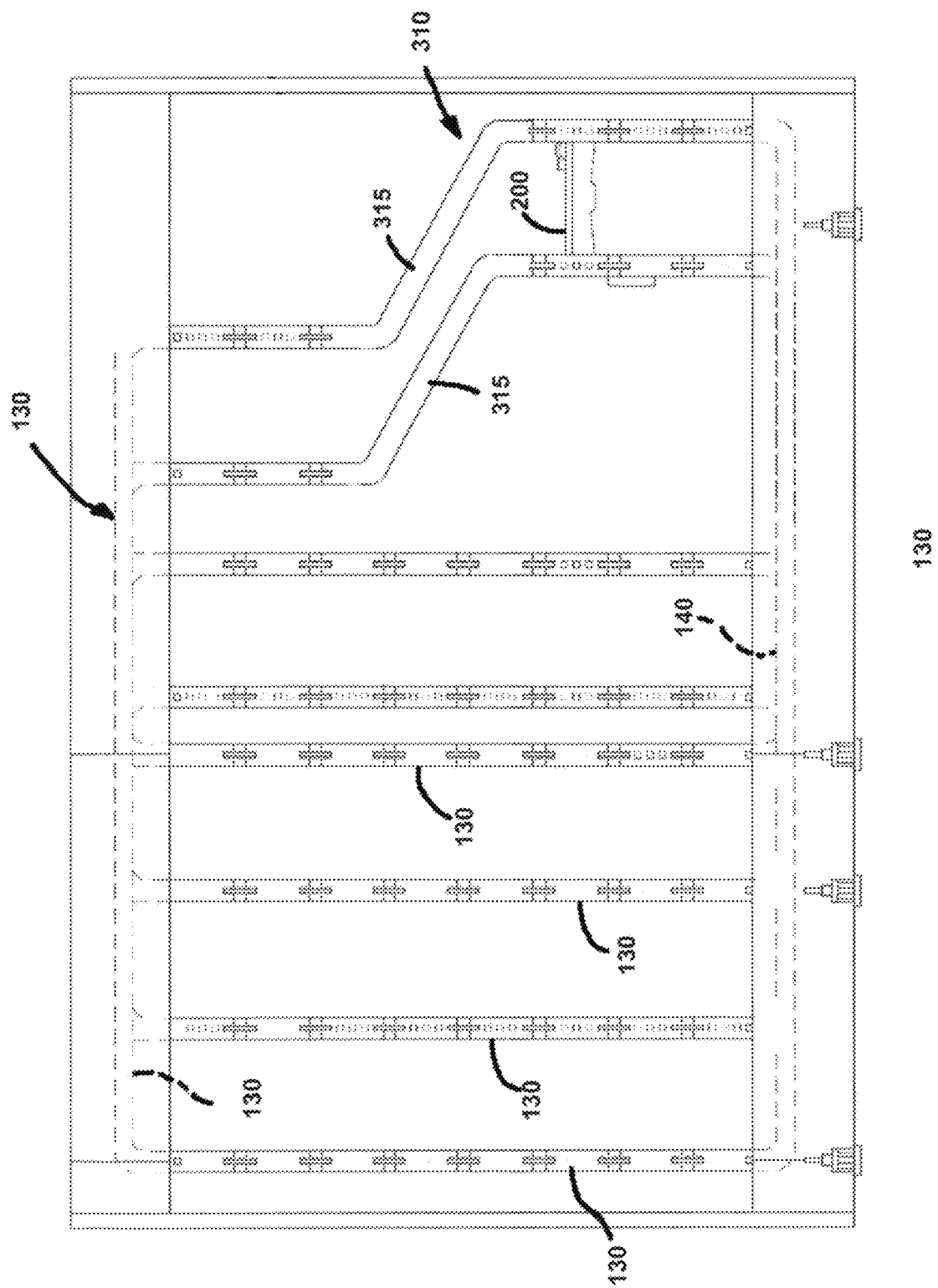
FIG. 8 is a side view of a track system for use in a sorting and retrieving apparatus such as the apparatus illustrated in FIG. 1, according to one or more embodiments.
Figure 9:
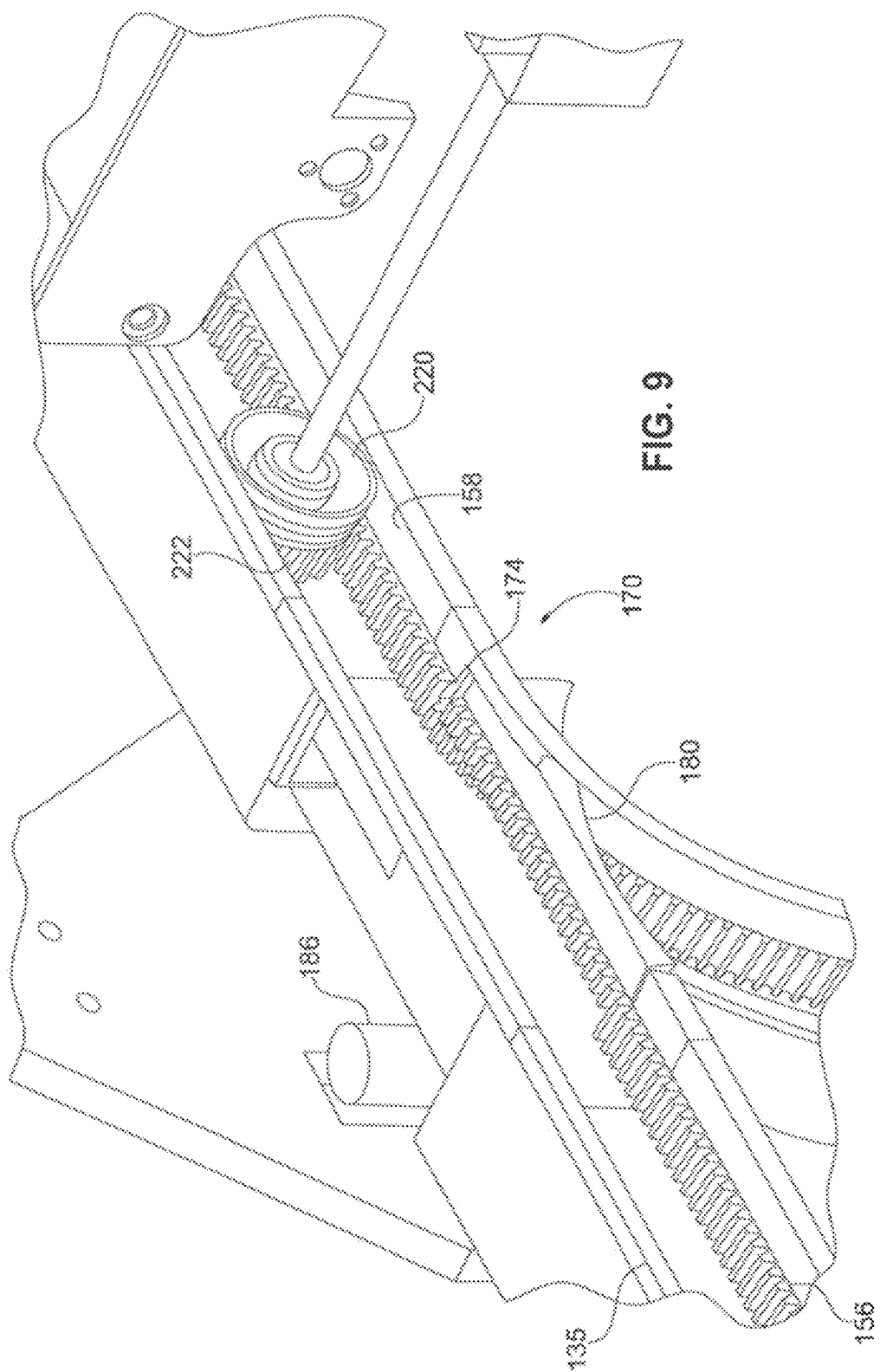
FIG. 9 is an enlarged fragmentary perspective view of a portion of the track of the track system illustrated in FIG. 8.
Figure 12:
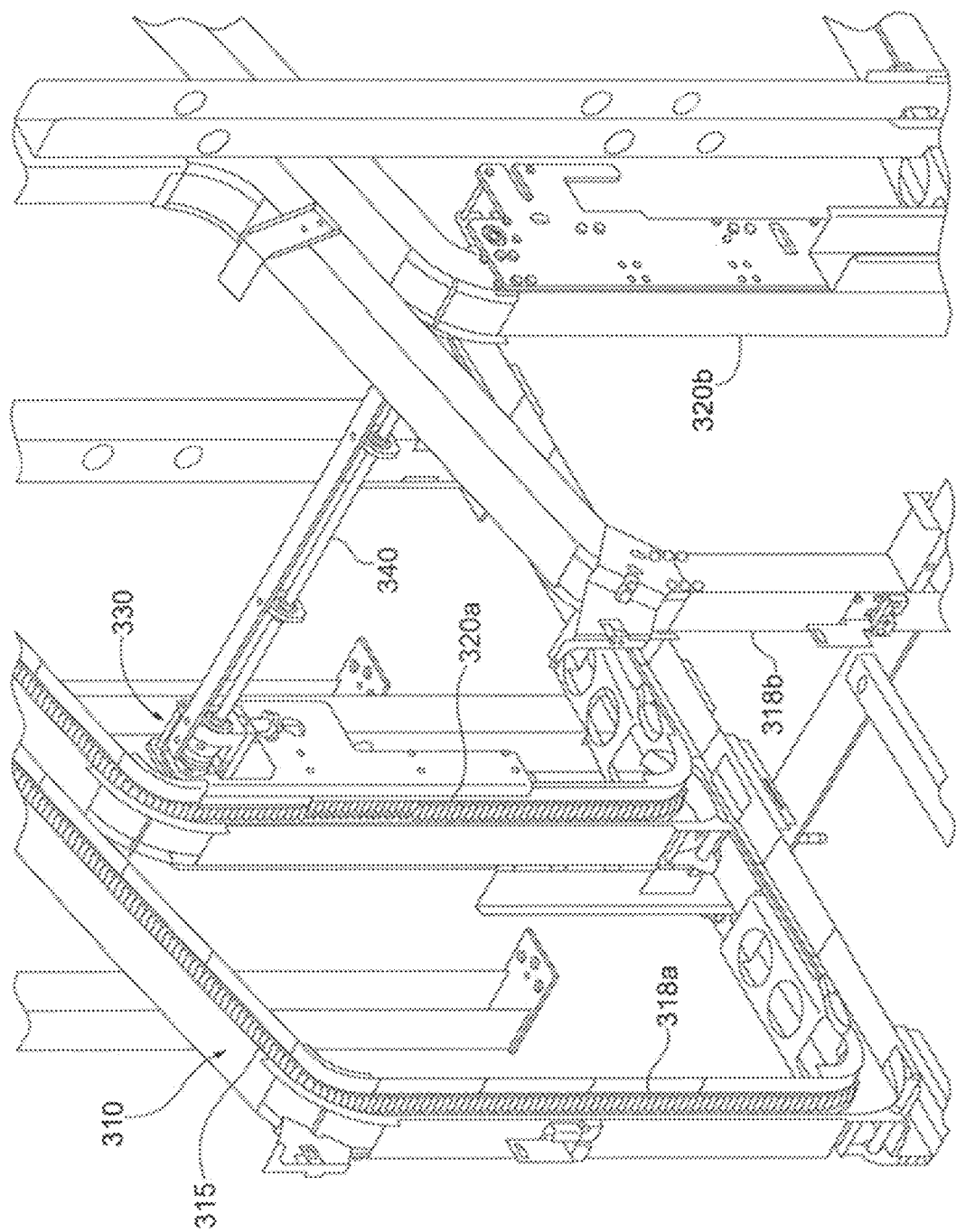
FIG. 12 is an enlarged perspective partially broken away of a picking station illustrated in FIG. 2.

As shown in FIGS. 8 and 12, the output station 310, comprises a pick station that has a curved track 315 that curves outwardly from the array of bins so that totes carried by the cars are readily accessible to the operator. After leaving the picking station, the car travels upwardly along two pairs of vertical tracks legs and then horizontally along two upper tracks 135. The car 200 travels along the upper rail until it reaches the appropriate column containing the storage area for the item that the car is carrying. Referring to FIG. 9, the track 110 may include gates 180 that direct the car 200 down the vertical legs and the car may stop at the appropriate storage area. The car 200 may then discharge the item into the storage area.

After discharging the item, the car 200 may travel to a second storage location to retrieve the next item to be transported to the picking station. After retrieving the item, the car 200 may travel down the vertical legs 130 of the column until it reaches the lower rail 140. Gates may direct the car along the lower rail, and the car may follow the lower rail to return to the pick station 310 to deliver another item.

The cars 200 are semi-autonomous vehicles that each may have an onboard power source and an onboard motor to drive the cars along the track 110. The cars may also include a loading/unloading mechanism 210, for loading items onto the cars and discharging items from the cars.

Since the system 10 includes a number of cars 200, the positioning of the cars is controlled to ensure that the different cars do not crash into each other. In one embodiment, the system 10 uses a central controller 450 that tracks the position of each car 200 and provides control signals to each car to control the progress of the cars along the track. The central controller 450 may also control operation of the various elements along the track, such as the gates 180. Alternatively, the gates may be actuated by the cars 200.

Referring to FIG. 1, the system may include an array of destination areas or storage locations 100 for receiving items. The storage locations 100 may be arranged in columns. Additionally, the system 10 may include a track 110 for guiding the cars 200 to the storage locations 100. In the following description, the system is described as delivering and/or retrieving items to and from storage areas 100. The items may be configured so that an individual item is stored at a storage location. However, in a typical operation environment, the items are stored in or on a storage mechanism, such as a container or platform. For instance, the items may be stored in a container, referred to as a tote. The tote may be similar to a carton or box without a lid, so that an operator can easily reach into the tote to retrieve an item at the picking station. Although the present system is described as using totes, it should be understood that any of a variety of storage mechanisms can be used, such as pallets or similar platforms.

The storage locations 100 can be any of a variety of configurations. For instance, the simplest configuration is a shelf for supporting the items or the container holding the items. Similarly, the storage locations 100 may include one or more brackets that cooperate with the storage mechanism to support the storage mechanism in the storage location. For example, in the present instance, the storage locations include brackets similar to shelf brackets for supporting one of the totes.

Referring to FIG. 1, at least one output station 310, referred to as a pick station, is disposed adjacent the storage locations. The cars 200 retrieve totes 15 from the storage locations 100 and deliver the totes to the pick station 310 where an operator can retrieve one or more items from the totes. After the operator retrieves the items, the car 200 advances the tote 15 away from the picking station 310 and returns to one of the storage locations.

Figure 3:
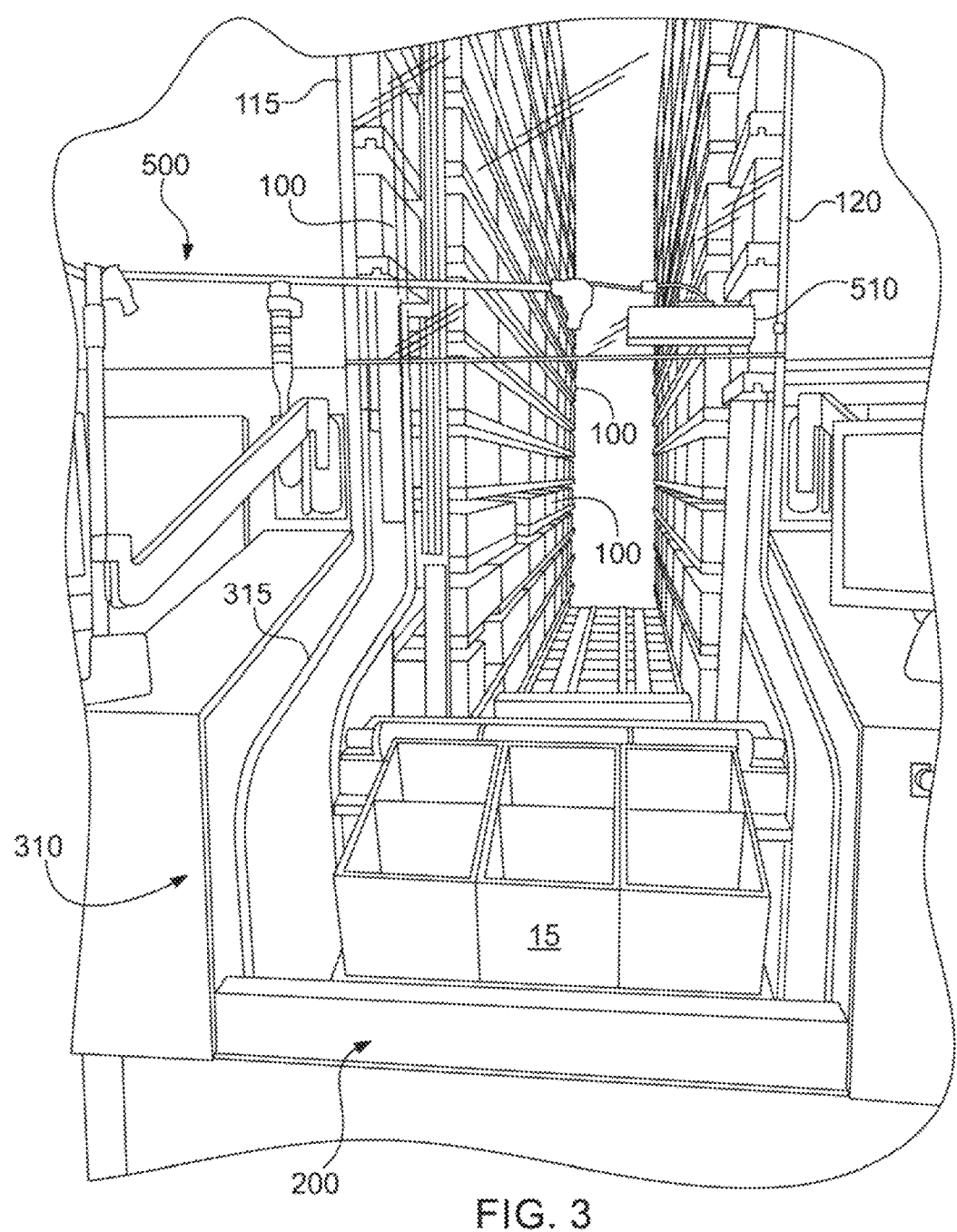
FIG. 3 is a fragmentary enlarged end view of the picking station illustrated in FIG. 2.
Figure 4:
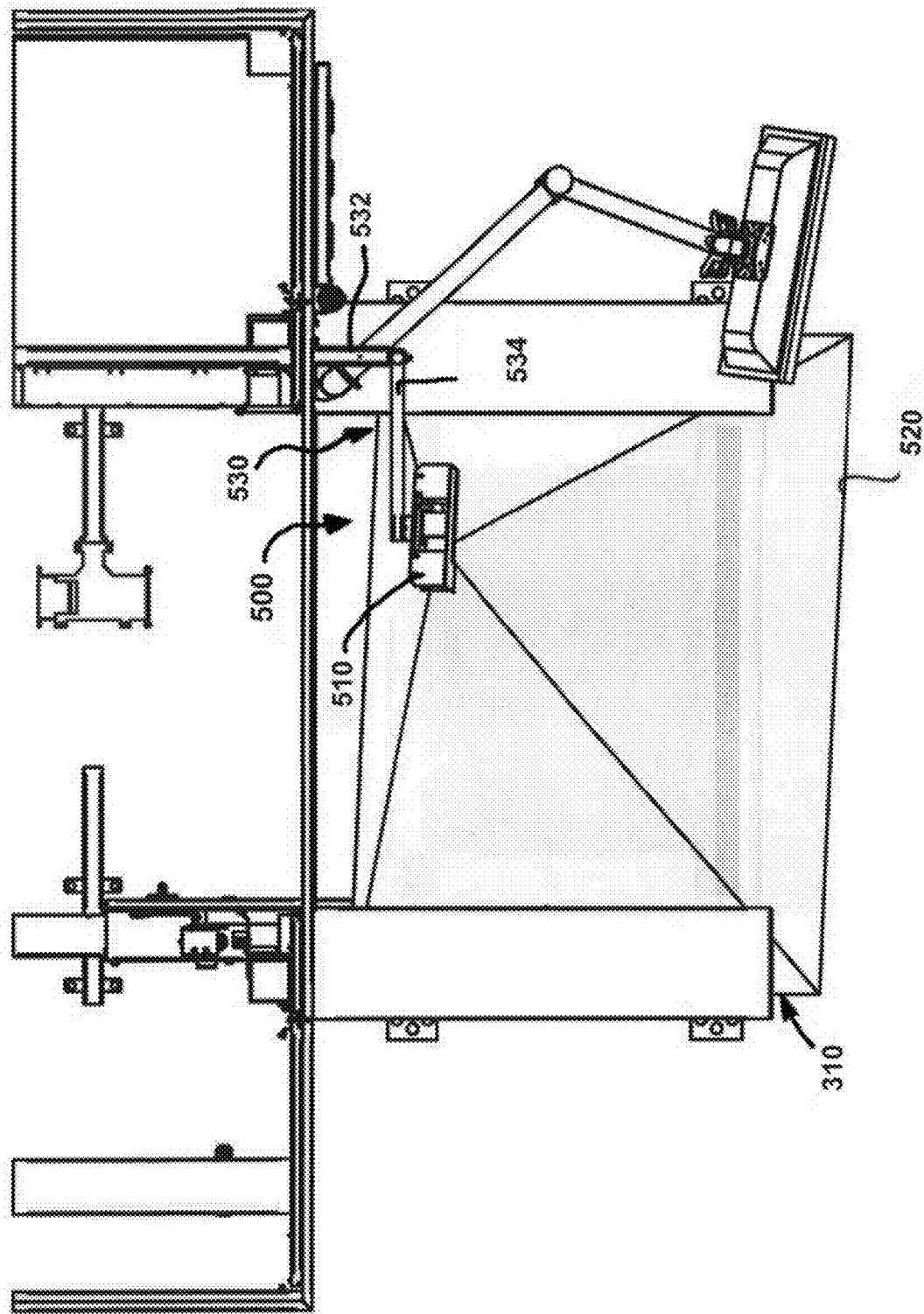
FIG. 4 is an enlarged plan view of the picking station illustrated in FIG. 2.
Figure 11:
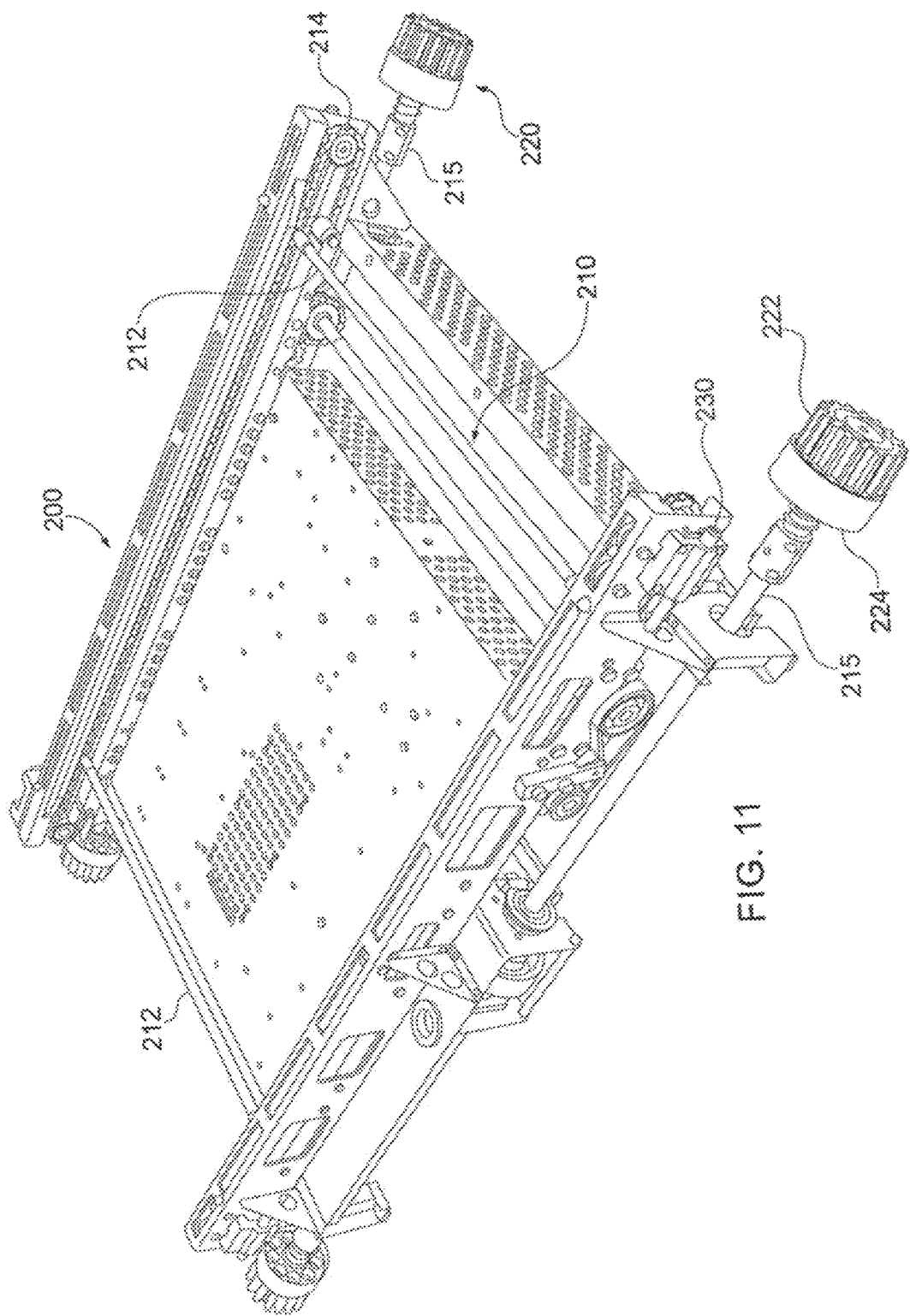
FIG. 11 is a top perspective view of an embodiment of a delivery vehicle, which may form part of the sorting and retrieving apparatus illustrated in FIG. 1.

As can be seen in FIGS. 1 and 3, the track 110 includes a front track 115 and a rear track 120. The front and rear tracks 115, 120 are parallel tracks that cooperate to guide the cars around the track. As shown in FIG. 11, each of the cars includes four wheels 220: two forward wheel and two rearward wheels. The forward wheels 220 ride in the front track, while the rearward wheel ride in the rear track. It should be understood that in the discussion of the track the front and rear tracks 115, 120 are similarly configured opposing tracks that support the forward and rearward wheels 220 of the cars. Accordingly, a description of a portion of either the front or rear track also applies to the opposing front or rear track.

Figure 10:
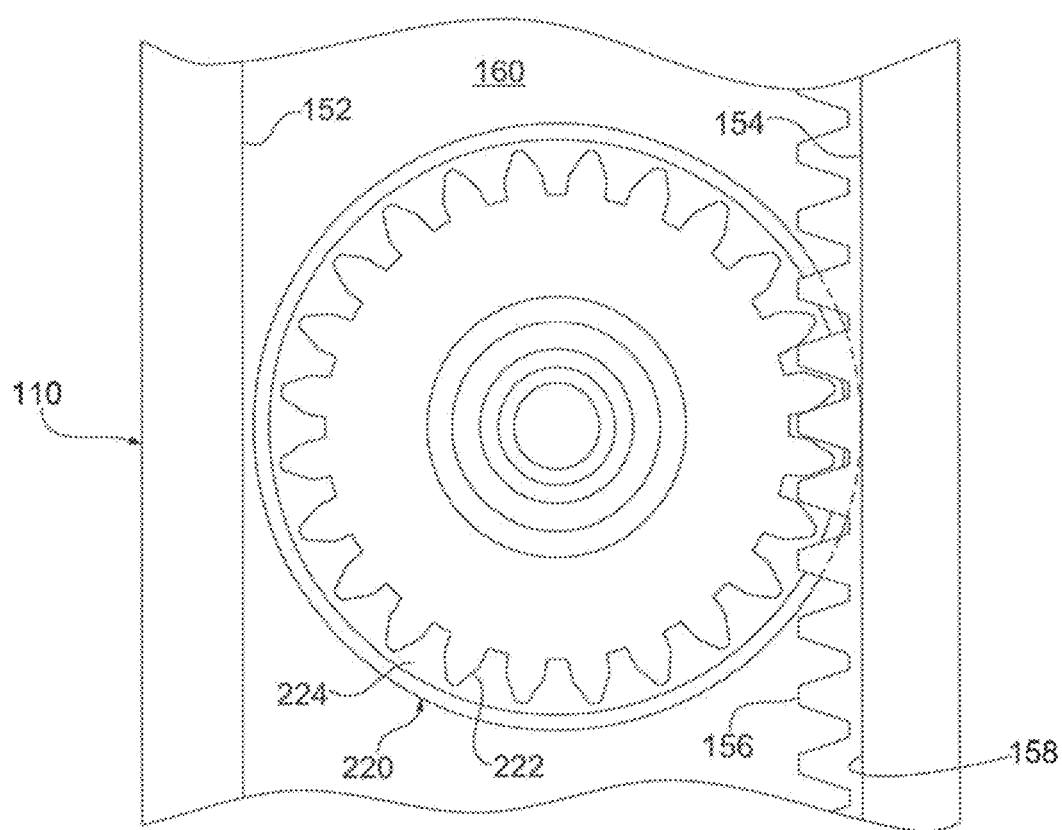
FIG. 10 is an enlarged view of a wheel of the delivery vehicle, shown in relation to the track of the track system of FIGS. 8 and 9.

Referring to FIG. 10, the details of the track will be described in greater detail, however, as noted above, it should be appreciated that the illustrated track is merely an exemplary track that can be used with the system. The precise configuration may vary according to the application and as noted above, the system may not include the track.

The track 110 may an outer wall 152 and an inner wall 154 that is spaced apart from the outer wall and parallel to the outer wall. The track also may have a back wall 160 extending between the inner and outer walls. As can be seen in FIG. 10, the outer and inner walls 152, 154 and the back wall form a channel. The wheels 220 of the car ride in this channel.

Referring to FIGS. 9-10, the track may include both a drive surface 156 and a guide surface 158. The drive surface positively engages the cars to enable the car to travel along the track. The guide surface 158 guides the car, maintaining the car in operative engagement with the drive surface 156. In the present instance, the drive surface is formed of a series of teeth, forming a rack that engages the wheels of the cars as described further below. The guide surface 158 is a generally flat surface adjacent the rack 156. The rack 156 extends approximately halfway across the track and the guide surface 158 extends across the other half of the track. As shown in FIGS. 9 and 10, the rack 156 may be formed on the inner wall 154 of the track. The opposing outer wall 152 may be a generally flat surface parallel to the guide surface 158 of the inner wall.

As described above, the track 110 may include a plurality of vertical legs extending between the horizontal upper and lower rails 135, 140. An intersection 170 may be formed at each section of the track at which one of the vertical legs intersects one of the horizontal legs. Each intersection may include an inner branch 172 that is curved and an outer branch 176 that is generally straight. The intersections of the vertical legs with the lower rail incorporate similar intersections, except the intersections are reversed.

Each intersection 170 may include a pivotable gate 180 that may have a smooth curved inner race and a flat outer race that has teeth that correspond to the teeth of the drive surface 156 for the track. The gate 180 may pivot between a first position and a second position. In the first position, the gate 180 is closed so that the straight outer race 184 of the gate is aligned with the straight outer branch 176 of the intersection. In the second position, the gate is open so that the curved inner race 182 of the gate is aligned with the curved branch 172 of the intersection.

Accordingly, in the closed position, the gate is pivoted downwardly so that the outer race 184 of the gate aligns with the drive surface 156. In this position, the gate blocks the car from turning down the curved portion, so that the car continues straight through the intersection. In contrast, as illustrated n FIG. 9, when the gate is pivoted into the open position, the gate blocks the car from going straight through the intersection. Instead, the curved inner race 182 of the gate aligns with the curved surface of the inner branch 172 and the car turns through the intersection. In other words, when the gate is closed, a car goes straight through the intersection along either the upper rail 130 or the lower rail, depending on the location of the intersection. When the gate is opened, the gate directs the car from either a vertical rail to a horizontal rail or from a horizontal rail to a vertical rail, depending on the location of the intersection.

In the foregoing description, the gates allow one of the cars to either continue in the same direction (e.g. horizontally) or turn in one direction (e.g. vertically). However, in some applications, the system may include more than two horizontal rails that intersect the vertical columns. In such a configuration, it may be desirable to include a different rail that allows the cars to turn in more than one direction. For instance, if a car is traveling down a column, the gate may allow the car to turn either left or right down a horizontal rail, or travel straight through along the vertical column. Additionally, in some instances, the cars may travel upwardly The gates 180 may be controlled by signals received from the central controller 450. Specifically, each gate may be connected with an actuator that displaces the gate from the opened position to the closed position and back. There may be any of a variety of controllable elements operable to displace the gate. For instance, the actuator may be a solenoid having a linearly displaceable piston.

Alternatively, the gates 180 may be controlled by an actuator on the cars 200. For instance, the gates may include a passive actuator that responds to an actuator on the cars. If the actuator on the car engages the gate actuator then the gate may move from a first position to a second position.

In the foregoing description, the system 10 is described as a plurality of storage areas 100. However, it should be understood that the system may include a variety of types of destinations, not simply storage locations. For instance, in certain applications, the destination may be an output device that conveys items to other locations. According to one example of an output device, the system may include one or more output conveyors that convey items away from the storage locations and toward a different material handling or processing system. For instance, an output conveyor may convey items to a processing center. Therefore, if an item is to be delivered to processing center, the car will travel along the track to the output conveyor. Once the car reaches the output conveyor, the car will stop and transfer the item onto the output conveyor. Further, it should be understood that the system may be configured to include a plurality of output devices, such as output conveyors.

In some embodiments, the system may include a plurality of output conveyors in addition to the storage locations. In other embodiments, the system may only include a plurality of output devices, such as conveyors, and the system is configured to sort the items to the various output devices.

Delivery Vehicles

Referring now to FIG. 11, the details of the delivery vehicles 200 will be described in greater detail. Each delivery vehicle is a semi-autonomous car that may have an onboard drive system, including an onboard power supply. Each car may also include a mechanism for loading and unloading items for delivery. Optionally, each car also includes a gate actuator 230 for selectively actuating the gates 180 to allow the vehicle to selectively change direction.

The car 200 may incorporate any of a variety of mechanisms for loading an item onto the car and discharging the item from the car into one of the bins. Additionally, the loading/unloading mechanism 210 may be specifically tailored for a particular application. In the present instance, the loading/unloading mechanism 210 may comprise a displaceable element configured to engage an item stored at a storage location 190 and pull the item onto the car. More specifically, in the present instance, the car includes a displaceable element configured to move toward a tote 15 in a storage location 100. After the displaceable element engages the tote 15, the displaceable element is displaced away from the storage location 100, thereby pulling the tote onto the car 200.

Referring to FIG. 11, in the present instance, the loading/unloading mechanism 210 may comprise a displaceable rod or bar. The bar may extend across the width of the car 200 and both ends may be connected with drive chains that extend along the sides of the car. A motor may drive the chains to selectively move the chain toward or away from storage locations. For example, as the car approaches a storage location to retrieve a tote 15, the chain may drive the rod toward the storage location so that the bar engages a groove or notch in the bottom of the tote. The chain then reverses so that the bar moves away from the storage location 100. Since the bar is engaged in the notch in the tote, as the bar moves away from the storage location, the bar pulls the tote onto the car. In this way, the loading/unloading mechanism 210 may be operable to retrieve items from a storage location. Similarly, to store an item in a storage location 100, the chain of the loading/unloading mechanism 210 drives the bar toward the storage location until the item is in the storage location. The car then moves downwardly to disengage the bar from the tote 15, thereby releasing the tote.

Additionally, since the system 10 includes an array of storage locations 100 adjacent the front side of the track 110 and a similar array of storage locations adjacent the rear side of the track, the loading/unloading mechanism 210 is operable to retrieve and store items in the forward array and the rearward array. Specifically, as shown in FIG. 11, the loading/unloading mechanism 210 includes two bars spaced apart from one another. One bar is operable to engage totes in the forward array, while the second bar is operable to engage totes in the rearward array of storage locations.

The car 200 may include four wheels 220 that are used to transport the car along the track 110. The wheels 220 may be mounted onto two parallel spaced apart axles 215, so that two or the wheels are disposed along the forward edge of the car and two of the wheels are disposed along the rearward edge of the car.

The car may include an onboard motor for driving the wheels 220. More specifically, the drive motor may be operatively connected with the axles to rotate the axles 215, which in turn rotates the gears 222 of the wheels. The drive system for the car may be configured to synchronously drive the car along the track. In the present instance, the drive system is configured so that each gear is driven in a synchronous manner.

The drive motor may include a sensor that is operable to detect the rotation of the motor to thereby determine the distance the car has traveled. Since the gears are rigidly connected with the axles, which are in turn synchronously connected with the drive motor, the forward distance that the car moves corresponds can be exactly controlled to correlate to the distance that the drive motor is displaced. Accordingly, the distance that a car has traveled along the determined path depends on the distance through which the car motor is rotated. To detect the rotation of the drive motor the motor may include a sensor for detecting the amount of rotation of the drive motor.

The car 200 may be powered by an external power supply, such as a contact along the rail that provides the electric power needed to drive the car. However, in the present instance, the car includes an onboard power source that provides the requisite power for both the drive motor and the motor that drives the load/unload mechanism 210. Additionally, in the present instance, the power supply is rechargeable. Although the power supply may include a power source, such as a rechargeable battery, in the present instance, the power supply is made up of one or more ultracapacitors. The ultracapacitors can accept very high amperage to recharge the ultracapacitors. By using a high current, the ultracapacitors can be recharged in a very short time, such as a few seconds or less.

The car includes one or more contacts for recharging the power source. In the present instance, the car includes a plurality of brushes, such as copper brushes that are spring-loaded so that the brushes are biased outwardly. The brushes cooperate with a charging rail to recharge the power source.

Each car may include a load sensor for detecting that an item is loaded onto the car. The sensor(s) ensure that the item is properly positioned on the car. For instance, the load sensor may include a force detector detecting a weight change or an infrared sensor detecting the presence of an item.

As discussed further below, the car further includes a processor for controlling the operation of the car in response to signals received from the central processor 450. Additionally, the car includes a wireless transceiver so that the car can continuously communicate with the central processor as it travels along the track. Alternatively, in some applications, it may be desirable to incorporate a plurality of sensors or indicators positioned along the track. The car may include a reader for sensing the sensor signals and/or the indicators, as well as a central processor for controlling the operation of the vehicle in response to the sensors or indicators.

Pick Station

As described previously, the system 10 is configured so that the cars 200 retrieve items from the storage locations 100 and transport the items to the pick station 310. Referring now to FIGS. 1, 3, 8 and 12, the pick station 310 will be described in greater detail.

In one mode of operation, the system 10 is used to retrieve items needed to fill an order. The order may be an internal order, such as parts needed in a manufacturing process in a different department, or the order may be a customer order that is to be filled and shipped to the customer. Either way, the system automatically retrieves the items from the storage areas and delivers the items to the picking station so that an operator can pick the required number of an item from a tote. After the item is picked from a tote, the car advances so that the next item required for the order is advanced. The system continues in this manner so that the operator can pick all of the items needed for an order.

In the present instance, the pick station 310 is positioned at one end of the array of storage locations. However, it may be desirable to incorporate multiple pick stations positioned along the track 110. For instance, a second pick station can be positioned along the opposite end of the array of storage locations. Alternatively, multiple pick stations can be provided at one end.

In the present instance, the pick station 310 is configured so that the car travels upwardly to present the contents to the operator so that the operator can more easily retrieve items from the tote 15. Referring to FIG. 1, at the picking station the track includes a curved section 315 that bends upwardly and away from the operator. In this way, the car moves upwardly and then stops at a height that facilitates the operator removing items from the tote. After the operator removes items from the tote, the car moves laterally away from the operator and the vertically to the upper horizontal rail 135.

The system can be configured so that the cars tilt at the pick station 310 thereby making it easier for the operator to retrieve items from the tote. For instance, as the car approaches the pick station, the controller 450 may control the car so that the rearward set of wheels continue to drive after the forward set of wheel stop. This raises the rearward edge of the car (from the perspective of the operator). After the operator picks the items from the tote, the forward set of wheels (relative to the operator) drive first, thereby level off the car. Once leveled, the four wheels drive synchronously.

Although the cars may be tilted by controlling operation of the cars, if the wheels of the cars positively engage drive elements in the track, such as the toothed wheels 220 that mesh with teeth in the track as described above, the wheels 220 may bind if the rear wheels are driven at a different rate than the forward wheels. Accordingly, the track system may be modified so that the track moves to tilt the tote toward the operator.

Referring to FIGS. 8 and 12, the details of the track system in the picking station 310 will be described in greater detail. At the end of the columns of storage locations, the track curves outwardly away from the vertical columns of the system to form the curved track 315 of the pick station 310. The track sections of the pick station include parallel forward track sections 318a, 318b that support and guide the forward axle 215 of the cars 200 and parallel rearward track sections 320a, b that support and guide the rear axle 215 of the cars. The forward track sections 318a, b extend vertically upwardly and then curve back toward the vertical columns of storage locations. The rearward track sections 320a, b are substantially parallel to the forward track sections 318a, b and curve substantially similarly to the forward track sections 318 a, b. In this way, the forward and rearward track sections guide the cars so that the cars can maintain a substantially horizontal orientation as the cars are driven along the curved track 315.

In the present instance, the rearward track sections 320a, b are configured so that the rearward axle of the car 200 can be lifted while the car is stopped at the pick station 310. By lifting the rearward axle of the car 200, the tote on the car is tilted to present the contents of the tote to the operator to facilitate the picking process.

Configured as described above, the track in the pick station 310 is operable tilt a car 200 in the pick station as follows. When the car enters the pick station, the car is driven partway up the vertical track sections 318a, b and 320a, b. When the car reaches a predetermined vertical position along 318a, b and 320a, b, the controller controls the car so that the car stops at a predetermined height in the picking station. When the car stops in the pick station 310, the car is in a generally or substantially horizontal orientation. In the present instance, the car is displaced vertically upwardly until the rear wheels 220 of the car 200 engage the lower section of the moveable track 324 and the car is stopped so that the car wheels 220 are engaged with the lower section of the moveable track. Once the car is stopped in the pick station, displacing the moveable track upwardly displaces the rear wheels of the car upwardly, thereby lifting the rearward edge of the tote on the car upwardly. In this way, the tote is tilted relative to the horizon to present the contents of the tote to the operator at the pick station so that the operator can more easily remove items from the tote. Once the operator provides a signal to the system indicating that the appropriate items were removed from the tote, the system controls the track to lower the car into a substantially horizontal position.

The pick station 310 may include a plurality of items to improve the efficiency of the pick station. For instance, the pick station may include a monitor to display information to aid the operator. As the car approaches the pick station, the system 10 may display information such as how many items need to be picked from the tote for the order. Additionally, since the operator may pick items for multiple orders, the system may display which order(s) the item is to be picked for, in addition to how many of the item are to be picked for each order. The system may also display information such as how many items should be remaining in the tote after the operator picks the appropriate number of items from the tote.

The system may also include a sensor for sensing that an item has been removed from a tote so that the car can automatically advance away from the pick station after the operator picks the items. Similarly, the system may include a manually actuable item, such as a button, that the operator actuates after picking the appropriate number of items from a tote. After the operator actuates the button, the system advances the tote away from the picking station.

In the foregoing description, the system is discussed as being used to retrieve a discrete number of items to be used to fill an order. The operator picks the items from one or more totes as the totes are presented to the operator and the operator agglomerates the items, such as by placing the items into a container for shipping. Alternatively, rather than agglomerating a plurality of items, the system may incorporate one or more buffer conveyors that convey items away from the system. The operator places the picked items onto the buffer conveyor in the appropriate order and the conveyor(s) convey the items away from the system.

Over-Height Detection

As noted above, the system includes a plurality of destinations 100 for receiving items. The destinations 100 may have pre-determined characteristics, such as height, width and depth. The characteristics need not be the same for each destination. However, in the present instance, the characteristics are known for each destination. For example, the height of a destination may be known. Therefore, if an item is to be delivered to the location and the height of the item extends above the height of the destination, the vehicle may have trouble delivering the item into the destination or the item may be impact an edge or wall of the destination, thereby damaging either the overhanging item or part of the system. For example, the system may store items in totes or containers and the destinations may be configured to accommodate the totes. The overall storage density of the system is increased by minimizing the difference between the size of the destinations and the size of the totes. Accordingly, there may be a minimal gap between the sides of the destination and the sides of the tote. Therefore, it is desirable to ensure that items in the tote do not extend outside of the tote.

In light of the foregoing, the system may include a detection assembly 500 for detecting items that extend beyond a pre-defined boundary relative to the vehicles 200. The detection assembly 500 may be placed at any of a variety of locations along the path of the vehicles 200. In the present instance, the detection assembly 500 is positioned at the picking station 310 to monitor items that may extend beyond a boundary while the vehicle is at the picking station. In the following discussion, the detection assembly 500 is described as detecting items that extend beyond a predefined height above the vehicle 200. However, it should be understood that they system may be configured to detect items that extend beyond a boundary relative to any side of the vehicle (i.e. right side, left side, front side, back side). Accordingly, the following discussion is not intended to limit the detection to detecting over-height items.

As described previously, the system includes a front track 115 and a rear track 120 spaced apart with an aisle in between the two tracks. The vehicles 200 travel along the tracks in the aisle. The picking station 310 may be disposed at the end of the aisle as shown in FIG. 3. In such an arrangement, the detection assembly 500 may be positioned in the aisle and directed toward the path that the vehicles travel. In particular, the detection assembly 500 may overhang the picking station between the front track 115 and the rear track 120.

In some embodiments, the detection assembly 500 may be fixed at a pre-determined height above the picking station 310. In such embodiments, the vehicles 200 may stop at a generally consistent location at the picking station so that the distance from the detection assembly 500 to the vehicle is generally constant when the vehicle is stopped at the picking station. The detection assembly 500 detects whether the distance from the detection assembly to any item on the vehicle is less than a pre-determined threshold. If the detection assembly detects that the distance is less than the threshold, the system declares an over-height error. In response to the over-height error, the system may provide a signal (either visual or audible or both) to the operator. The operator may then manipulate one or more items on the vehicle to eliminate the over-height error.

In alternate embodiments, the vehicles 200 may stop at different locations relative to the picking station 310 such that the position of a sensor of detection assembly 500 may not serve a reliable basis from which to determine an over-height error. For example, the vehicles 200 may stop at a variety of locations (and, therefore, distances and angular orientations) relative to the position of the detection assembly 500. A detector of detection assembly 500 may, in some embodiments, acquire relative distance data from which a determination can be made as to whether and/or the extent to which an item surface portion extends beyond a reference plane. In some embodiments, the reference plane may be coplanar with the item supporting surface of the vehicles 200 and, in other embodiments, the reference plane may be offset from the item supporting surface by a selectable or predetermined distance.

The detection assembly 500 includes a detector 510 mounted on a mounting arm 530. The mounting arm 530 may be a fixed arm, however, in the present instance the mounting arm is an articulating arm having a first arm 532 and a second arm 534. A first end of the first arm 532 is pivotably connected to a wall of the system 10 adjacent the picking station. The first arm 532 pivots about a vertical axis so that the arm can be pivoted into the aisle between the front track and the rear track 120. Additionally, the pivot axis of the first arm may be positioned outside of the aisle between the front track 115 and the rear track 120 so that the first arm can be pivoted away from the aisle. A first end of the second arm 534 is pivotably connected to a second end of the first arm 532 so that the second arm can pivot horizontally relative to the first arm. Alternatively, the second arm may be pivotable vertically relative to the first arm. The detector 510 is mounted to a second end of the second arm 534. The detector 510 may be rigidly connected to the second arm, however, in the present instance, the detector is pivotable connected to the second arm. By pivoting the detector 510, the angle of the detector relative to the vehicles can be adjusted. Similarly, a universal connection may be provided so that the angle of the detector 510 relative to the vehicles 200 may be adjusted relative to two or more axes. For instance, the detector 510 may be connected to the second arm via a universal connection or the first or second arms may include a universal connection.

The detector 510 may be any of a variety of detection elements designed to sense the distance between the detector and an object, referred to as range-finding or 3D surface measuring techniques. For example, in a time of flight system, modulated light (e.g., infrared light) is projected by an emitting source onto objects whose position is to be measured. A detector implementing a time of flight operation includes hardware that is sensitive to the reflected, modulated light. The phase shift between the projected and reflected light is measured and converted into a distance estimate. The theory of operation is described in greater detail in a white paper which can be obtained from Texas Instruments at http://www.ti.com.cn/cn/lit/wp/sloa190b/sloa190b.pdf, and a more detailed description thereof has therefore been omitted as being unnecessary for an understanding of the present disclosure. In an alternate 3D scanning technique known as "triangulation, the distance and angles between imagers and the projected light source (e.g., laser or light emitting diode) creates a base of a triangle. The angle of the projected light returning to the imager from the surface completes a triangle where a 3D coordinate can be calculated. By applying this principle of solving triangles repetitively, a 3D representation of an object is created.

A structured light 3D sensing device operates according to yet another theory of operation. A device projects a pattern (or series of patterns) of light onto 3D object(s) to be measured. One or more cameras are positioned at known distance and angle from the projector. The camera and associated hardware and software use the deformation of the light pattern (and known distances/angles) to calculate a set of 3D surface points. Finally, in a stereo vision system, two or more cameras are positioned at known distances and angles from each other. The disparity between the images (of the same scene/object) taken from different cameras is used by the hardware and software to calculate a set of 3D points.

As discussed further below, some embodiments consistent with the present disclosure are based on projected light. However, it should be understood that the system may incorporate other range finding techniques, such as emitting ultrasonic waves or microwaves. For example, if the system incorporates an ultrasound detection technique, the transmitter may transmit ultrasonic pulses. If an object is in the path of the ultrasonic pulse, part or all of the pulse will be reflected back and will be detected by the detector. By measuring the difference between the time the pulse was emitted and the time the reflected pulse was detected, the distance to the object in the path can be determined.

Figure 13:
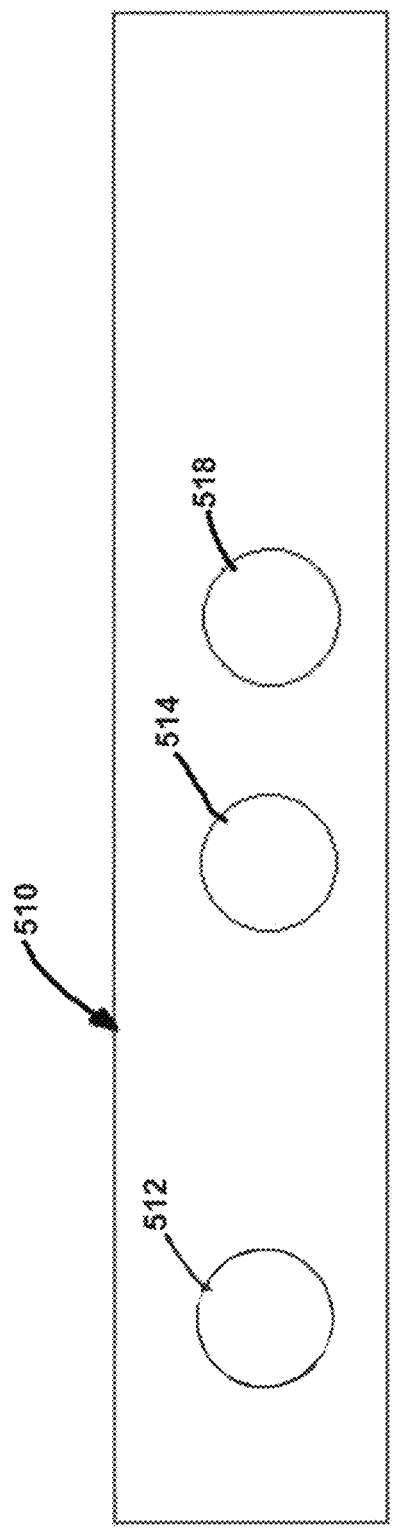
FIG. 13 is a diagrammatic side view of an over-height detector of the apparatus illustrated in FIG. 1.

Referring to FIG. 13, the detector 510 includes an emitter 512 and a sensor 514. The emitter 512 may be a light source that projects a light pattern, such as a structured light pattern. The sensor 514 may be an imaging element, such as a CMOS or other imaging element. The sensor 514 detects the projected light pattern to acquire image data. The processor analyzes the image data to detect differences between the projected light pattern and the detected light pattern. The analysis may be performed on a pixel by pixel basis to evaluate the depth measurement for each pixel. The detector 510 may also include a second detector 518 in the form of a camera or video element. For instance, the second camera may be configured as a gray scale or RGB CMOS photosensor array.

Alternatively, the emitter 512 may emit a single light pulse and the sensor 514 may be an image sensor that detects the reflected light pulse. The processor processes the image data for each pixel to evaluate the time between when the light pulse was emitted and the reflected light pulse was detected at each pixel. In this way, the processor analyzes the image data on a pixel by pixel basis to evaluate the depth measurement for each pixel.

As can be seen from the foregoing, the emitter 512 and 514 may use any of a variety of range finding techniques to acquire data indicative of the distance between the emitter and objects on the vehicles. Using the data, the system can determine whether objects extend beyond a height or width threshold relative to the vehicle. In particular, the system can determine whether objects extend above a height threshold above the vehicle.

In one embodiment, the detector 510 can detect the height that objects extend above the vehicles as follows. The system tracks the position of each vehicle 200 as each vehicle travels along any of a variety of paths. Since the position of each vehicle at a particular time is known, the distance from the detector to an adjacent vehicle is known. Accordingly, the controller may control the detector 510 to acquire depth data at a particular time correlating to a known position of the vehicle relative to the detector. For instance, at a particular time, the position of the vehicle may be a pre-determined distance (e.g. 36 inches or 1 meter) from the detector 510. When the vehicle is at the pre-determined distance, the detector 510 scans the vehicle to determine depth data for items scanned by the detector. If any item has a depth that extends from the vehicle more than a pre-determined threshold, then the system flags the vehicle and controls it accordingly. For instance, the system may control the vehicle by directing it toward a particular location so that the item can be removed or re-loaded onto the vehicle so that the item does not extend to high above the vehicle. Alternatively, the system may stop the vehicle so that the vehicle does not progress along its path until the over-height item is corrected by removing or re-loading the item.

Figure 2:
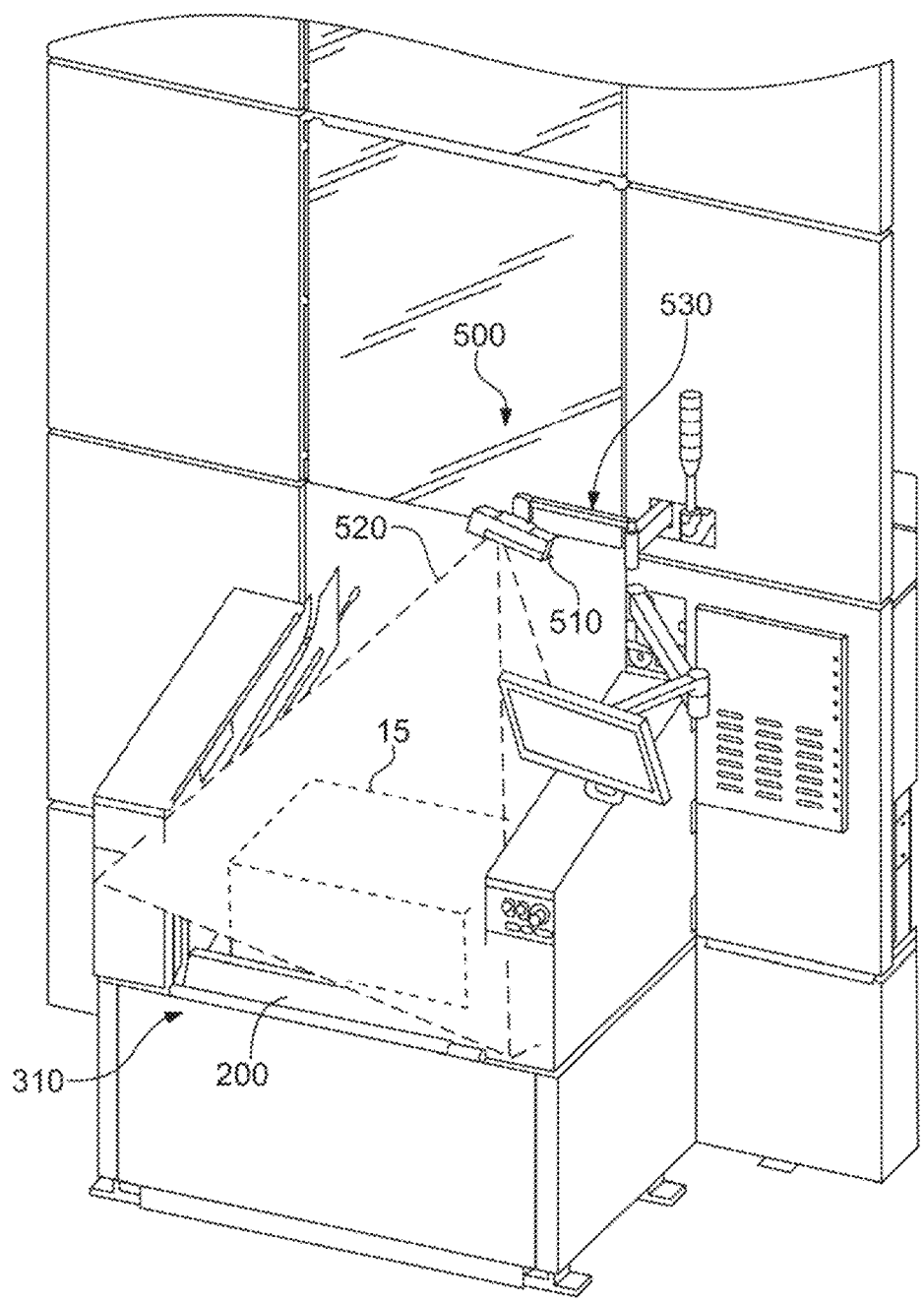
FIG. 2 is a fragmentary enlarged perspective view, illustrating a picking station of the sorting and retrieving apparatus illustrated in FIG. 1.

Referring to FIG. 2, in the present instance, the detector 510 is positioned adjacent the picking station 310 so that the detector scans the vehicle 200 at the picking station. Specifically, the detector 510 is mounted so that the emitter 512 projects a light pattern 520 onto the vehicle 200. The sensor 514 detects the light pattern reflected from the vehicle and its contents to acquire image data indicative of the distance between the sensor and the vehicle and item on the vehicle. In particular, the system includes an image processor in the form of a microprocessor that processes the image data from the over-height detector 510 to determine the presence of items that extend vertically above a plane relative to the vehicle. For instance, the system may analyze the image data to detect objects that extend above a plane that is parallel to and spaced above the top of the vehicle.

In one example, the system may process the data from the detector to detect items that project above a plane that is pre-determined height above the top of the vehicle. The pre-determined height is variable depending on the configuration of various characteristics of the system, such as the height of each storage location. For example, the pre-determined height may be approximately 12 inches.

Figure 5:
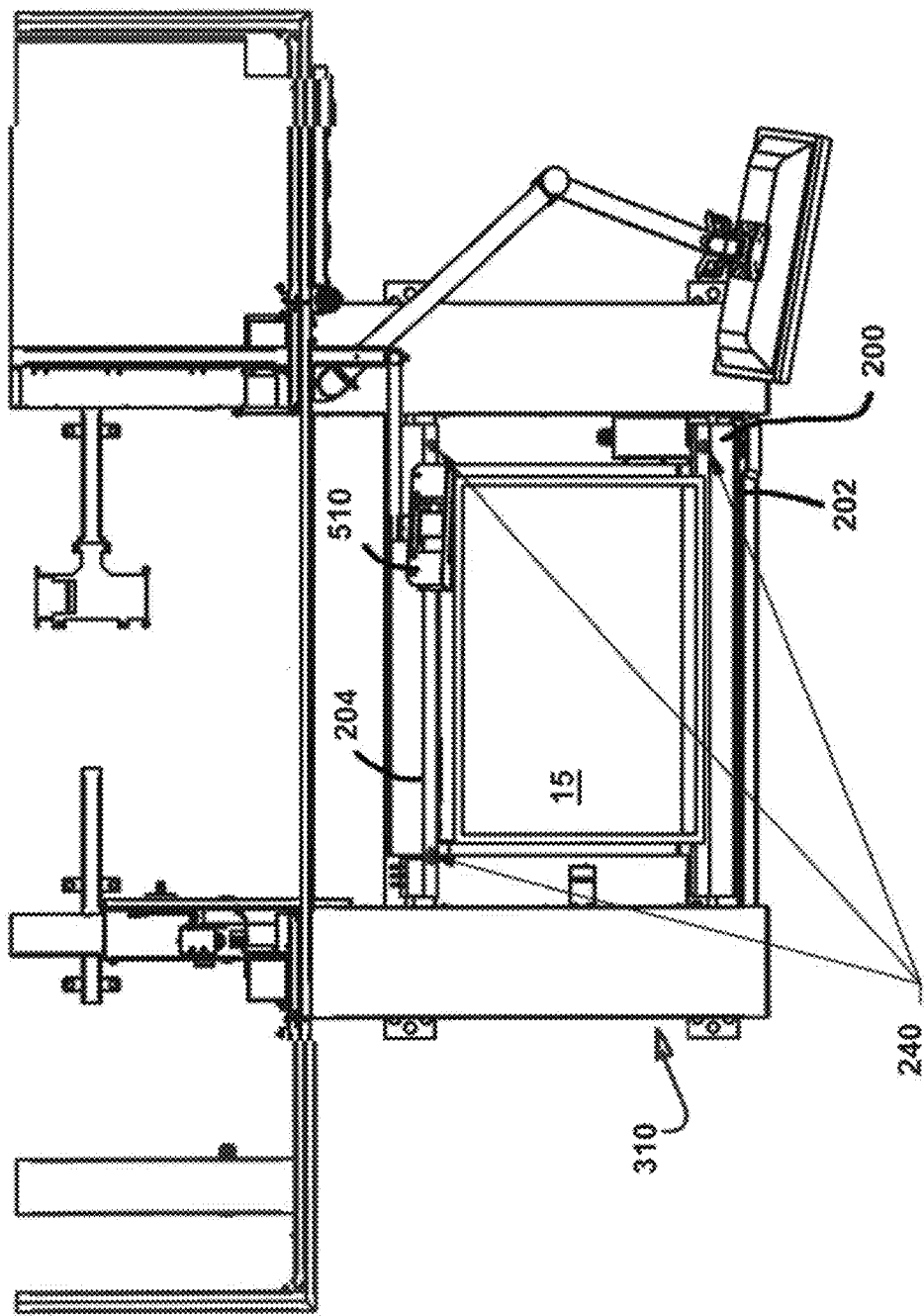
FIG. 5 is enlarged plan view of the picking station illustrated in FIG. 2.
Figure 6:
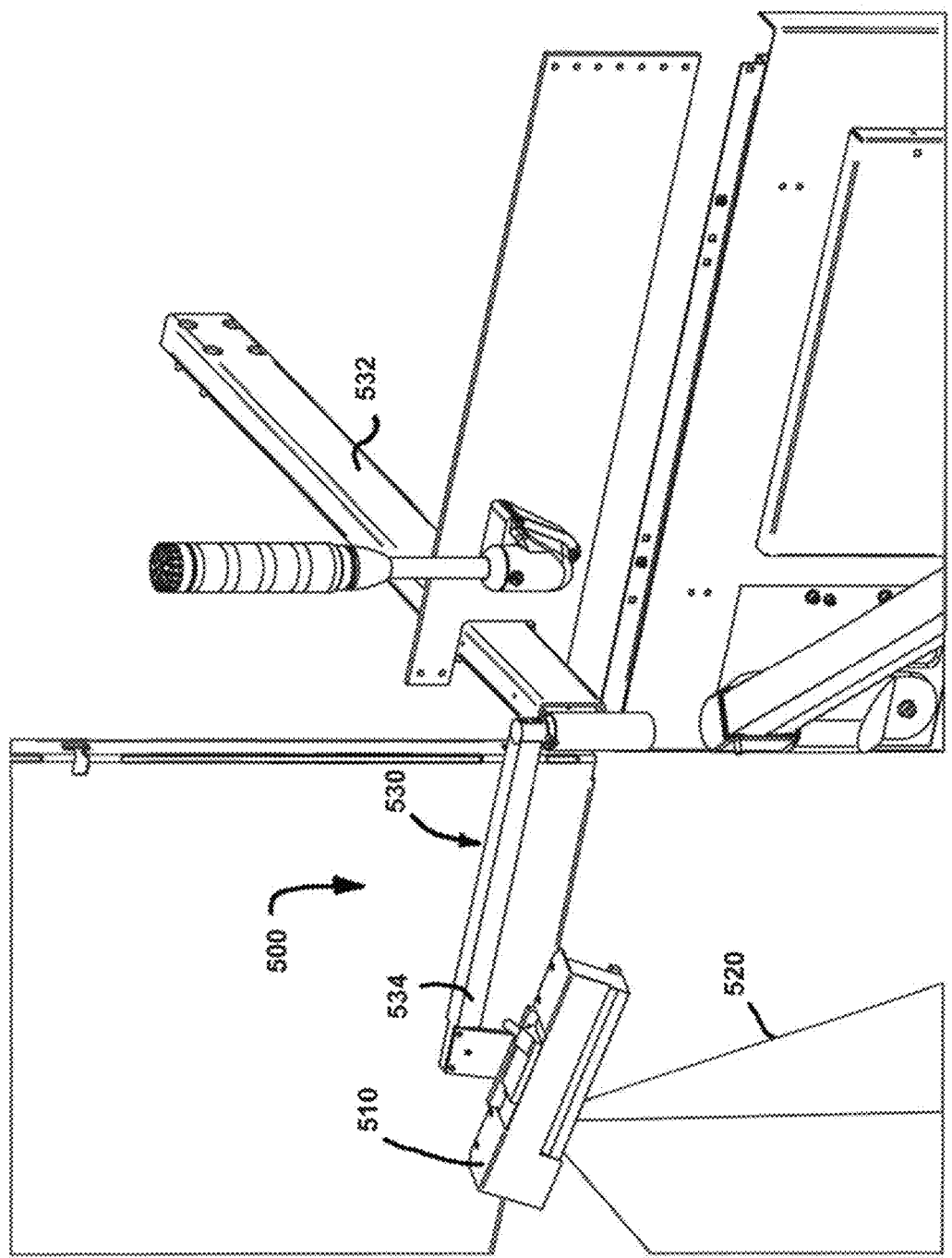
FIG. 6 is an enlarged fragmentary perspective view of a detection assembly for detecting items that extend beyond a pre-defined boundary, which may be used with a sorting and retrieving apparatus such as the one depicted in FIG. 1 in accordance with one or more embodiments.

Referring to FIG. 5, the system 10 may be configured to detect reference elements on the vehicle to determine the plane of the top of the vehicle. As noted before, the detector 510 may be at a fixed position relative to the picking station and the system may control the movement of the vehicle so that the location and orientation of the top of the vehicle may be known. This data may be used to determine whether items project above a pre-determined height relative to the vehicle. Alternatively, the vehicle may include a plurality of reference markers 240. The reference markers 240 are configured to be identifiable by the system based on one or more physical characteristics of the reference markers. For instance, the height, width, length and/or location of the reference markers 240 may readily distinguish the markers from other features of the vehicle 200 and items on the vehicle. Similarly, the overheight detector 510 may include a color or gray scale imaging element and system may process the image data to identify the reference points based on the color or shape of the reference markers. Alternatively, the reference markers may be elements of the vehicle 200 or the container on the vehicle that are identifiable by analyzing the depth data or by analyzing 2D optical image data. For example, the containers on the vehicles may be standardized and the upper rim of the container may be distinguishable from surrounding items so that the system can detect three points on the rim of the container, which would identify a plane that is parallel to the upper surface of the vehicle.

In the present instance, each vehicle may include three reference markers 240. The reference markers 240 are spaced apart from one another at or adjacent the top plane of the vehicle. By processing the depth data from the detector to identify the three reference markers 240 the system identifies three known reference points. These three reference points define a reference plane (i.e. the reference plane is defined as the plane that includes all three reference points). The system can then process the depth data from the detector to identify any data points that are located above a certain height above the reference plane. Alternatively, a plane parallel to the reference plane may be defined, which is parallel to or spaced above the reference plane by a predetermined distance. The pre-determined distance would correspond to the maximum height that an item may extend above the reference plane. Any depth data that is above this parallel plane would represent an over-height item that should be re-positioned or re-oriented on the vehicle so that the item is below the desired height threshold.

As shown in FIGS. 3 & 8 and discussed previously, the vehicle 200 may be tilted at the picking station so the forward edge 202 of the vehicle is below the rearward edge 204 of the vehicle. Specifically, the vertical position of the forward edge 202 is lower than the vertical position of the rearward edge. In this way, the vehicle 200 tilts forwardly so that the contents in the container on the vehicle may be presented to the operator at the picking station 310. When the vehicle 200 is tilted at the picking station the upper surface of the vehicle is oriented at an angle relative to the horizon. Therefore, it is desirable to perform the over-height analysis relative to the angle of the vehicle rather than relative to the horizon. For this reason, as described above, the system may identify a plane that is substantially parallel to the top surface of the vehicle. The over-height analysis is then performed to identify items that project over a height that is a pre-determined height above the reference plane. Since the reference plane may be at an angle to the horizon, the pre-determined height is measured in a direction that is normal to the reference plane.

Configured as described above, the system 10 may use data from the over-height detector to control the operation of the vehicles 200 as follows. The over-height detection assembly 500 may be mounted along a path that the vehicles follow. The over-height detector 510 obtains image data of the vehicle when the vehicle is at a certain position along the path. An image processor processes the image data from the over-height detector to determine whether any items on the vehicle extend beyond a predetermined threshold. For instance, the image processor may process the data to determine if an item projects above the vehicle higher than a pre-determined acceptable height.

In the present instance, the over-height detector 510 is positioned at the picking station 310 so that the over-height detector acquires image data for a vehicle when the vehicle is stopped at the picking station. In particular, the vehicle is stopped at the picking station so that the vehicle is tilted relative to the horizon so that the contents on the vehicle are presented to the operator. The over-height detector scans or images the vehicle to obtain a plurality of data points or pixels. Each pixel is indicative of the distance from the over-height detector 510 to the vehicle and/or its contents. In this way, the pixels can be used to create a 3D rendering of the vehicle and the contents it carries.

The image processor processes the image data to identify known reference points on the vehicle or the items the vehicle is carrying. In the present instance, the image processor processes the image data to identify three reference points 240. The image processor may scan the entire image data set to identify the reference points based on various physical characteristics of the reference points 240. However, since the vehicles stop at a fairly uniform position at the picking station, the location of the reference points for a vehicle are generally located at a fairly uniform position relative to the over-height detector 510. Accordingly, the imaging processor may attempt to identify the reference points by using a template to process subsets of the image data corresponding to certain areas of the image. In this way, the image processor may only need to process the image data points for small subsets of the overall image to identify the reference points. If the image processor is unable to identify the three reference points using the data subsets based on the template, the image processor may analyze the entire image data set in order to identify the reference points.

As described above, the system may identify three points of interest that define a plane that corresponds to the support surface of the vehicle or is spaced a known distance from the support surface of the vehicle. However, it may be advantageous to identify the points of interest using an RGB or gray scale imaging mechanism 518. Specifically, as discussed previously, the overheight detector 510 may include an RGB imaging element such as a CCD or CMOS imaging sensor 518. The reference points on the vehicle 200 may be configured to have a particular shape, configuration and/or color. Accordingly, the system may analyze the data corresponding to the color or gray scale image of the vehicle. The data is analyzed to identify portions having characteristics corresponding to the known characteristics of the reference points 240. The analysis of the image to identify the reference points 240 may be performed in one of several processes. For instance, although the location of the vehicle at the picking station may vary, the location may be roughly similar enough so that the system can first analyze particular portions of the image data where the reference points would be expected to appear in the image. Alternatively, the system may simply process the entire image to identify portions of the image data having characteristics consistent with the known characteristics of the reference points.

After identifying the references points 240 in the color or gray scale image data, the identified data points are correlated with the corresponding points in the depth image data. Specifically, the 2D image data points are correlated with the 3D or depth image data to identify the position of the identified reference points. In particular, the image data of the color or gray scale image can be aligned, registered or mapped to the depth data. Similarly, the system may fuse the color or gray scale image with the depth image data. In either instance, once the reference points 240 are identified in the RGB or grayscale data, the system is able to identify the corresponding depth image data. Once the reference points are identified, the image processor may identify a plane that intersects all three points. This reference plane is then used to identify whether any items extend above a predetermined height above the vehicle. If the image processor determines that an item extends above the height threshold, the image processor sends a signal to the central controller indicating an over-height error. The system in turn provides a signal to the operator indicating that there is an over-height error. For instance, the system may signal an audible and/or visual alarm to the operator. Additionally or alternatively, the system may provide a visual warning on the display screen at the picking station. The visual warning may also show the operator which item on the vehicle has caused the over-height error.

In addition to providing an alarm or warning to the operator, the system may control the operator of the vehicle in response to an over-height error. For example, in response to receiving an over-height error signal from the image processor, the central controller 450 may control the vehicle at the picking station by maintaining the vehicle at the picking station until the over-height error is rectified. In particular, as described above, the system may advance a vehicle at the picking station when the operator pushes a button indicating that the operator has finished removing items from and/or inducting items onto the vehicle. However, if an over-height error is detected, the system may ensure that the vehicle is not advanced away from the picking station even if the advance button is pressed by the operator.

It should be appreciated that the over-height detector continues to obtain image data/depth data for a vehicle while the vehicle remains at the picking station. For instance, the over-height detector may scan the vehicle at a rate of greater than 1 frame per second. In some embodiments, the over-height detector may obtain data at a rate of from about 15 to about 60 frames per second, though sensors which acquire image samples at a rate above 60 frames per second or below 15 frames per second are also consistent with the present disclosure. In an illustrative embodiment, the over-height detector obtains data at a rate of approximately 30 frames per second.

In the foregoing discussion, the overheight detector 510 is described in terms of detecting whether an item on a vehicle extends beyond a predetermined dimensional threshold. However, it should be understood that the system can be utilized to identify a variety of conditions in which an error may occur due to an item on one of the vehicles. Accordingly, it should be understood that the detectors described above may be applicable to a variety of applications in which depth image data is processed to determine whether an item on a vehicle should be flagged as potentially creating an error in processing.

Figure 7A:
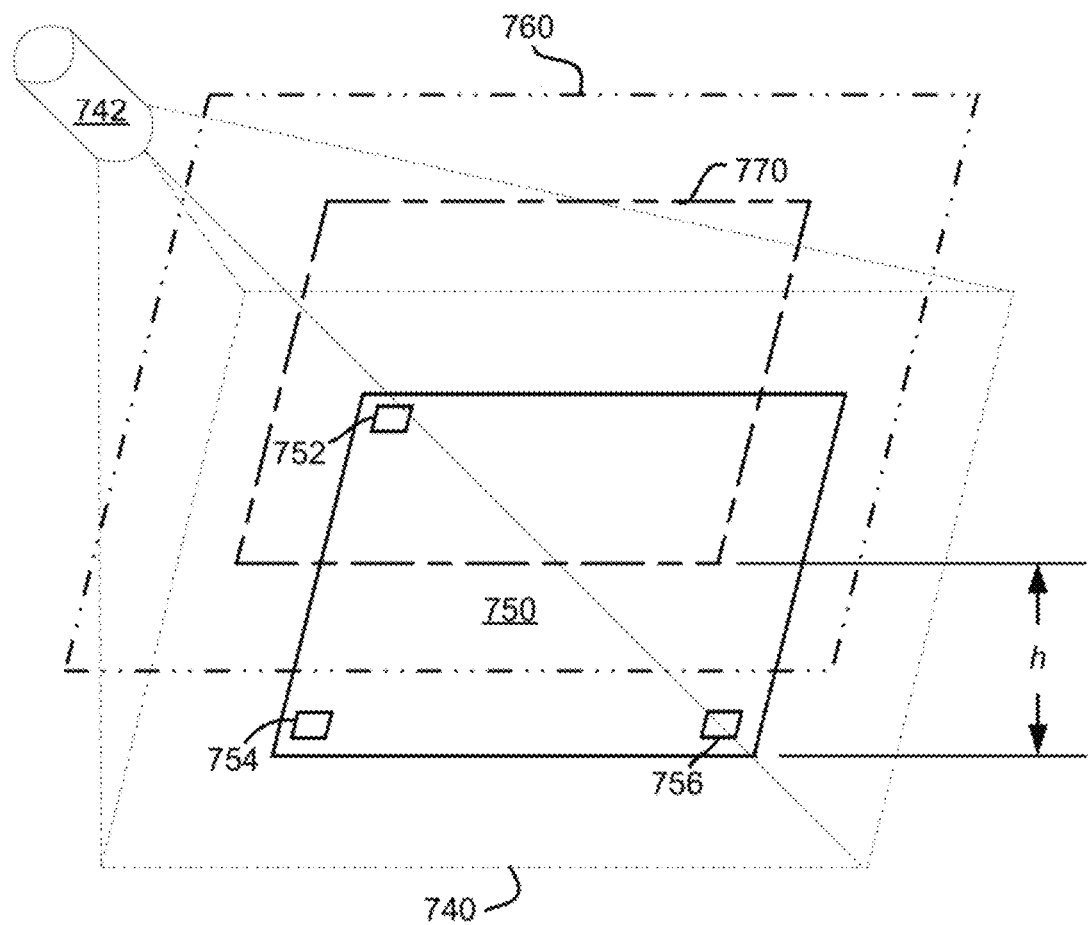
FIG. 7A is a perspective view depicting the determination of a base plane and reference plane in 3D space, following the location of reference points on an item supporting surface of a conveyor, according to embodiments consistent with the present disclosure.
Figure 7B:
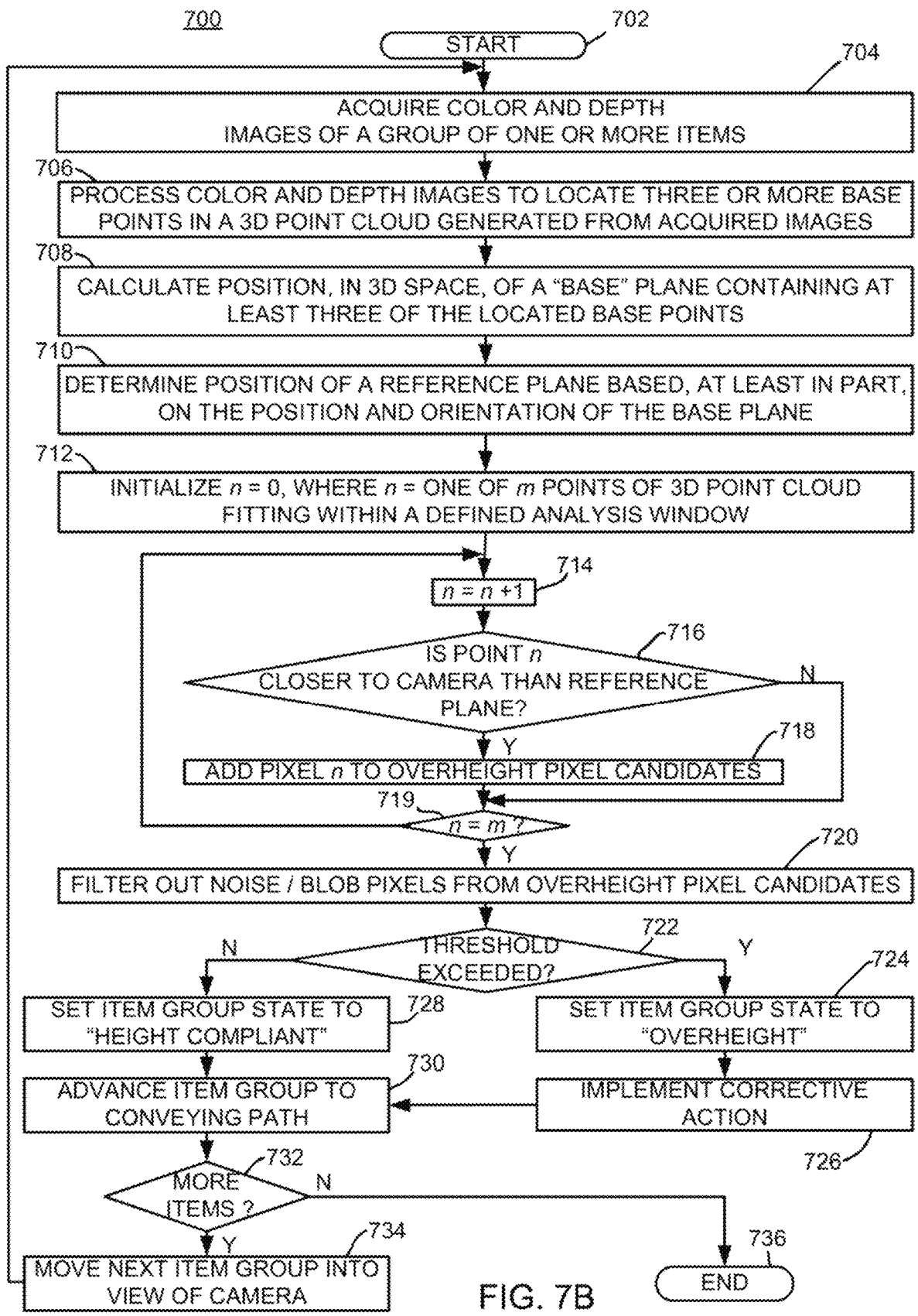
FIG. 7B is a flow diagram depicting a method for operating a material handling system based on whether or not an over-height condition (or other dimensional constraint violation) is detected, according to one or more embodiments.
Figure 7C:
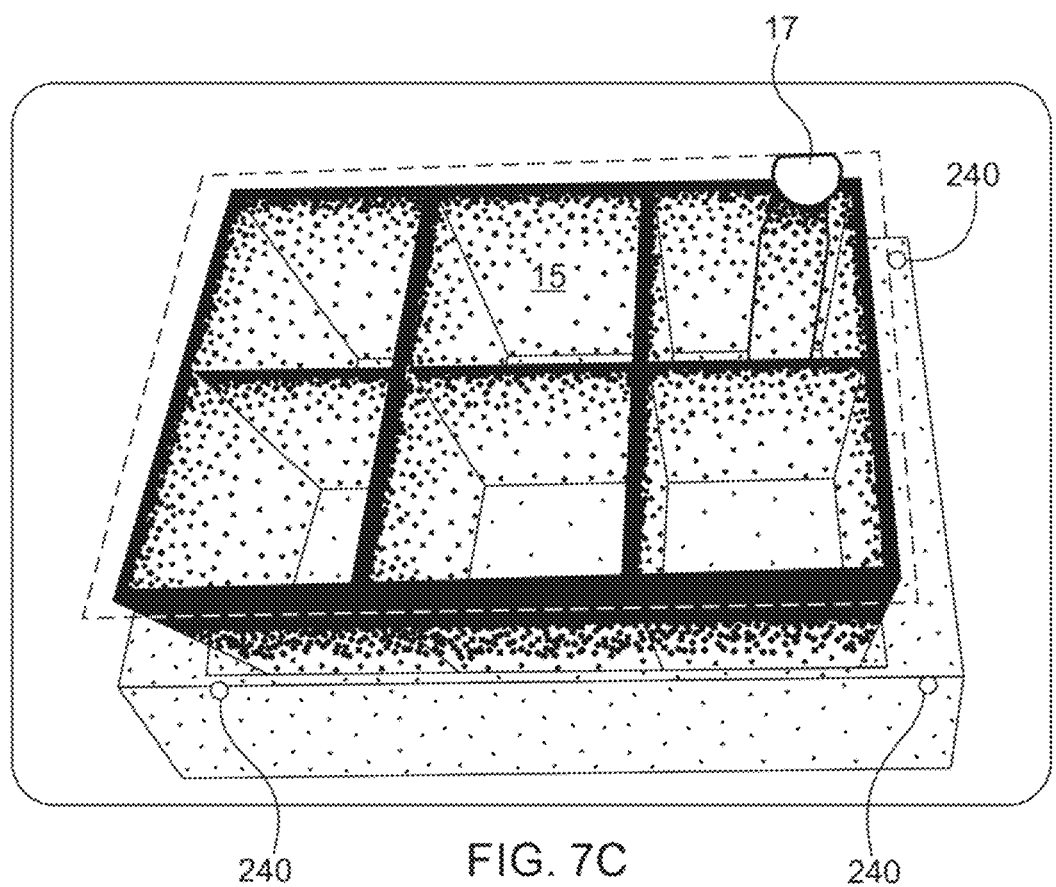
FIG. 7C is the height detection analysis of a delivery vehicle at the picking station illustrated in FIG. 2.

In embodiments consistent with FIGS. 7A-7C, an image sensor, such as the Kinect image sensing system commercially available from Microsoft Corporation of Redmond Washington and indicated generally at 742, is used to determine the location of a base plane in three-dimensional space. The Kinect system is operable to acquire 3D images of an object from a distance of about 0.5 m to about 4.5 m using a time of flight theory of operation. Optionally, the same imaging system may be operable to acquire color images of the same object.

As shown in FIG. 7A, a base plane designated 740 is within the field of view of sensor 742, and it is also coplanar with an item supporting surface 750 of material handling apparatus 10. By way of illustration, the item supporting surface 750 may be the surface of a vehicle 200 located at some point along or near the conveying path of material handling apparatus 10. In an embodiment, the item supporting surface 750 is defined by a vehicle 200 located at or near an article transfer station, such as the picking station 310 described above. Respective vehicles 200 may stop at correspondingly variable locations relative to sensor 742, such that the distance and angular orientation of base plane 740 may vary with respect to the sensor from dimensional inspection operation to the next. To account for such variations in relative positioning, the position and orientation of base plane 740 in free space is determined prior to each dimensional constraint compliance evaluation. In other words, each time the system scans the vehicle to determine whether the payload being carried by the vehicle is dimensionally compliant, the system first determines the base plane 740 for the vehicle. After determining the base plane, the system then determines whether the load is dimensionally compliant.

To derive the location of the base plane by calculation, three or more fiducial markings as, for example, markings 752, 754, and 756 show in FIG. 7A, may be defined on coplanar surfaces of each vehicle of the apparatus. In some embodiments, the fiducial markings may lie in a plane which is also coplanar with the item supporting surface of the corresponding vehicle. In other embodiments, the fiducial markings may lie in a parallel plane which is offset (e.g., by a known distance above or below the item supporting surface of the corresponding vehicle. In an embodiment, the fiducial markings are attached, affixed or otherwise applied to appropriate portions of a vehicle. As noted previously, an image sensor such as the aforementioned Kinect depth sensing camera is capable of producing both a time of flight 3D image and a color image of the same object. Location of the fiducial markings may be simplified by combining ("fusing") the color and 3D images.

In the absence of a color image, the position of the base plane may be alternatively determined by analyzing a 3D image to detect the presence and orientation of three or more three dimensional features (structural elements), of known geometry, within the image. Such analysis is somewhat higher in complexity, and may not yield the same degree of accuracy as can be obtained using fused color and 3D images, but is nonetheless an alternative which may be employed without departing from the spirit and scope of the present disclosure.

In embodiments where the apparatus includes one or more belt conveyors or roller conveyors, and it is desirable to determine the dimensional compliance of a group of one or more articles arranged on an item supporting surface(s) of the conveyor(s), the three or more fiducial markings (or 3D features of known geometry) may be arranged along opposite sides of the conveyor surface at an elevation co-planar with (or at a known elevation relative to) the item supporting surface of the conveyor. In contrast to systems which require an item to be precisely arranged on the conveyor path relative to a fixed measuring system (e.g. an array of emitters forming a "light sheet"), embodiments consistent with the present disclosure may determine compliance with one or more dimensional constraints despite variations in item position. The 3D image sensor need only have an unobstructed view of and be close enough to the item(s) under investigation to yield an image of sufficient resolution (pixel density) as to permit detection of the features to be handled.

Once the location of the base plane has been determined, the position of a reference plane 760 may be determined. The reference plane 760 may represent a dimensional constraint boundary. In other words, the reference plane 760 may represent a threshold or limit. Therefore, if the system detects an item that projects beyond the reference plane the system may declare an error or issue a warning to the operator. Similarly, the system may control the operation of the vehicle or other elements in response to detecting that an item projects past the reference plane 760.

As shown in FIG. 7A, the reference plane 760 is parallel to the base plane 740 and t separated or spaced apart from the base plane by a distance h. The distance h may correspond to the dimensional constraint. In some embodiments, the dimension h corresponds to a height dimension and is determined by reference to the height of the top edge of a tote 15 (FIG. 3) containing a group of one or more items. A dimensional tolerance may be added to the dimension h so as to take into account any variations in accuracy and/or to take advantage of available clearance between the appropriate (e.g. top) edge(s) of a tote or item and, for example, a storage space for which it may be intended.

Within the reference plane 760, a reduced-area analysis window 770 may be defined. Limiting the dimensional constraint analysis to window 770 excludes areas that may be irrelevant to the investigation. For example, in the case of a tote containing a group of one or more items and supported by a vehicle at a picking station, pixels corresponding to the sidewalls of the picking station and/or of a human picker standing within the boundaries of the base plane are irrelevant and only add to the complexity of the underlying analysis.

FIG. 7B depicts a method 700 for performing over-height analysis in accordance with one or more embodiments consistent with the present disclosure. The method 700 is entered at start block 702 and proceeds to 704. At step 704, using a 3D image and optionally a color sensing sensor such as overheight detector 510 or sensor 742, depth images and optionally color images of a group of one or more items are acquired. At step 706 depth images, and optionally the color images, are processed to locate three or more base points in a 3D point cloud generated from the images acquired at step 704. From step 706, the method 700 proceeds to step 708. At step 708, the position of a base plane in 3D space is determined by reference to three or more known reference points from the acquired image data. In an embodiment, the reference points comprise the respective centroid of each of three fiducial markings on surfaces coplanar from (or at a known elevation relative to) the surface that supports the group of one or more items. In some embodiments, the surface may be the supporting surface of a vehicle 200 of the material handling apparatus 10.

From step 708, the method 700 proceeds to step 710, where the position of a reference plane 760 is determined based on the position and orientation of the base plane. The same fiducial marks may be used to compute the boundaries of an array of points (pixel addresses), within base plane 740 (FIG. 7A). From such an array, the pixel addresses forming a corresponding array within analysis window 770 can be determined in any number of ways. Knowing, for example, the dimensional constraint h (inclusive of any applicable offset or tolerance factor as previously described), each point (i.e., pixel address) within an array corresponding to analysis window 770 can be derived by extending three or more lines, normal to base plane 760 and of length h, from corner points of the bounded array. With knowledge of the analysis window boundaries and offset from the base plane, each pixel address within the analysis window can be derived in a conventional way. The method 700 proceeds to step 712.

At step 712, the method 700 initializes a counter n, where n is one of m pixel addresses (points) within a point cloud bounded by analysis window 770 (FIG. 7A). The method advances to determination block 716, where a determination is made as to whether the current point n is closer to the camera sensor 742 (FIG. 7A) than the reference plane 760. If so, the method proceeds to step 718 where the row and column position of point n is added to a list of over-height candidate pixel addresses. From step 718 (or from step 716 if point n is not closer to the camera than the reference plane), method 700 proceeds to step 719 and determines whether the current address specified by pixel address counter n is equal to the m-the address of the analysis window. If the address for current point n is not equal to the m-the address, the method returns to step 714 and increments the counter value of n by 1, and the evaluation is repeated for the next pixel address.

If current point n is the mth address, the method proceeds to step 720, where "noise" pixels are filtered out from the list of over-height pixel candidates. By way of illustrative example, reflections and other specular phenomena may lead to local pixel errors which may be ignored during analysis. Likewise, a lone over-height pixel candidate, or a grouping of pixel candidates too small or too widely dispersed to be indicative of an item, may be disregarded from an evaluation process consistent with the present disclosure. Following the removal of such extraneous pixel candidates at step 720, the method 700 advances to step 722. At step 722, the number of remaining over-height pixel candidates may be compared to a predetermined threshold. In some embodiments, the threshold may be selected based on which item(s) make up the group being evaluated by method 700. If at step 722 it is determined that the threshold is exceeded, the method 700 advances to step 724. At step 724, an item group state is set to "over-height" and the method proceeds to step 726 where corrective action is initiated and/or implemented.

A variety of responses to an over-height state are contemplated by the scope of this disclosure. For example, in one embodiment, a visual and/or audible alert may be generated. In response to such an alert, a human operator, at a picking station 310 for example, may inspect the grouping of one or more items being processed and reposition the items so as to cure the over-height condition. Following such repositioning at step 724, method 700 is restarted such that steps 702 to 722 are repeated. In addition, or alternatively, an alternate storage or retrieval location—specifically dimensioned and arranged to accommodate oversized totes or items up to a higher threshold beyond the dimensional constraint(s) applied to "regular" groups of one or more items—may be selected for a different redirection of item(s). In other words, the system may control the vehicle by directing the vehicle to an alternate location or destination that is configured to receive vehicles that have a load (i.e. tote and/or items) that have one or more dimensions that exceed a predetermined threshold. Following corrective action at 724, the method proceeds to step 730, where the group of one or more items are advanced to a conveying path (e.g. either a default conveying path subject to the dimensional constraint(s) or, if selected, an alternate conveying path subject to a relaxed dimensional constraint). From step 730, method 700 proceeds to step 732, where a determination is made as to whether there are further groups of one or more items subject to dimensional compliance evaluation. If so, the method proceeds to step 734, where the next group of one or more items is moved into the field of view of the structured light 3D camera sensor, and thereafter the method is repeated starting at 704. If not, the method proceeds to step 736 and terminates.

FIG. 7C depicts the image generated by height detection analysis of a delivery vehicle 200 at the picking station illustrated in FIG. 2, according to the method 700 of FIG. 7B.

In the previous description, the detector assembly 500 is described as providing a system for determining whether items extend away from the vehicle beyond a threshold. Additionally or alternatively, the detector assembly 500 may operate to detect whether an item extends into a path of a vehicle which could cause the vehicle to collide with the item. For instance, the detector assembly 500 may detect whether an operator is in the path of a vehicle. If the detector assembly detects the operator in the path of a vehicle, the system may stop the vehicle to ensure that the vehicle does not collide with the operator to avoid injuring the operator.

In this way, the detection assembly can operate as a safety mechanism to prevent collisions.

One exemplary application of the detection assembly as a safety mechanism would be a configuration in which the detection assembly 500 is mounted adjacent the picking station 310 as illustrated in FIGS. 2-3. In such a configuration, the detection assembly can operate as both an over-height detector and as a safety mechanism. Specifically, when the detection assembly 500 scans the picking station to acquire depth data, the detection detects any over-height items, as described above. At the same time, if an operator has a hand in a tote on the vehicle, the operator's hand will likely extend above the height threshold for over-height items. Therefore, even if the items on the vehicle may be of proper height, the operator's hand will appear as an over-height item, triggering an over-height error. Therefore, the vehicle will not advance until the operator removes his or her hand from the tote and out of the path of the vehicle. Similarly, if the operator were to lean over into the path of the vehicle, the portion of the operator in the path of the vehicle will trigger an error that will prevent the vehicle from advancing until the operator is out of the path of the vehicle.

After the operator removes the appropriate item(s) from one of the cars, the car moves away from the pick station 310 if no over-height error is declared. As the car moves away from the pick station, the system may determine the storage location 190 where the item the car is currently carrying is to be returned, as well as the next item that the car is to retrieve.

Once the central controller 450 determines the appropriate storage location 100 for the item, the route for the car may be determined. Specifically, the central controller may determine the route for the car and communicates information to the car regarding the storage location into which the item is to be delivered. The central controller then controls the operation of the car to direct the car to the storage location into which the item is to be delivered. Once the car reaches the appropriate storage location, the car stops at the storage location 100 and the tote is displaced into the appropriate storage location.

One of the advantages of the system as described above is that the orientation of the cars does not substantially change as the cars move from travelling horizontally (along the upper or lower rails) to vertically (down one of the columns). Specifically, when a car is travelling horizontally, the two front geared wheels 220 cooperate with the upper or lower horizontal rail 135 or 140 of the front track 115, and the two rear geared wheels 220 cooperate with the corresponding upper or lower rail 135 or 140 of the rear track 120. As the car passes through a gate and then into a column, the two front geared wheels engage a pair of vertical legs 130 in the front track 115, and the two rear geared wheels engage the corresponding vertical legs in the rear track 120. It should be noted that when it is stated that the orientation of the cars relative to the horizon do not change, this refers to the travel of the vehicles around the track. Even though the cars may tilt relative to the horizon at the picking station, the cars are still considered to remain in a generally constant orientation relative to the horizon as the cars travel along the track 110.

As the car travels from the horizontal rails to the vertical columns or from vertical to horizontal, the tracks allow all four geared wheels to be positioned at the same height. In this way, as the car travels along the track it does not skew or tilt as it changes between moving horizontally and vertically. Additionally, it may be desirable to configure the cars with a single axle. In such a configuration, the car would be oriented generally vertically as opposed to the generally horizontal orientation of the cars described above. In the single axle configuration, the weight of the cars would maintain the orientation of the cars. However, when using a single axle car, the orientation of the storage locations would be re-configured to accommodate the vertical orientation of the cars.

In the foregoing discussion, the delivery of items was described in relation to an array of storage locations disposed on the front of the sorting station. However, the number of storage locations in the system can be doubled by attaching a rear array of storage locations on the back side of the sorting station. In this way, the cars can deliver items to storage locations on the front side of the sorting station by traveling to the storage location and then driving the loading/unloading mechanism 210 to unload the item into the front storage location. Alternatively, the cars can deliver items to storage locations on the rear side of the sorting station by traveling to the storage location and then driving the loading/unloading mechanism 210 rearwardly to unload the item into the rear storage location.

It will be recognized by those skilled in the art that changes or modifications may be made to the above-described embodiments without departing from the broad inventive concepts of the invention. For instance, in the above description, the system uses a wireless communication between the cars and the central controller. In an alternative embodiment, a communication line may be installed on the track and the cars may communicate with the central controller over a hard wired communication link.

It should therefore be understood that this invention is not limited to the particular embodiments described herein, but is intended to include all changes and modifications that are within the scope and spirit of the invention as set forth in the claims.

What is claimed is:

1. A material handling system, comprising:
a plurality of destination areas;
a plurality of vehicles for delivering items to the destination areas or retrieving items from the destination areas, wherein the vehicles travel a path;
means for controlling movement of the plurality of vehicles;
means for detecting whether an item on one of the vehicles extends beyond a pre-determined dimensional threshold relative to the vehicle, wherein the means for detecting is positioned adjacent the path on which the vehicles travel and the means for detecting is operable to obtain a plurality of depth data points, wherein each depth data point is indicative of the distance from the means for detecting to the vehicle and/or, its contents wherein the depth data points can be used to create a three-dimensional rendering of a target area that may include the vehicle and the contents that it carries;
wherein the means for controlling controls operation of the vehicle in response to the means for detecting determining that an item projects beyond the dimensional threshold.

2. The system of claim 1 wherein in response to the means for detecting determining that an item projects beyond the dimensional threshold, the means for controlling stops the vehicle from advancing until the item no longer projects above the dimensional threshold.

3. The system of claim 1 wherein the means for detecting comprises a structured-light 3D scanner, and wherein the means for detecting comprises an emitter operable to project a light pattern and an imaging element spaced apart from the emitter, wherein the imaging element is operable to detect the light pattern emitted onto the target area.

4. The system of claim 1 wherein the means for detecting identifies three reference points that identify a plane generally parallel with an upper surface of the vehicle.

5. The system of claim 4 wherein the plane is at an angle to the horizon.

6. The system of claim 3 wherein the means for detecting is configured to use the identified plane to identify depth data representative of items that extend above the pre-determined threshold.

7. The system of claim 1 wherein the means for detecting is positioned so that the vehicles pass by the means for detecting as the vehicles travel along the path.

8. A material handling system, comprising:
a plurality of destination areas;
a plurality of vehicles for delivering items to the destination areas or retrieving items from the destination areas, wherein the vehicles travel a path;
means for controlling movement of the plurality of vehicles;
means for detecting whether an item on one of the vehicles extends beyond a pre-determined dimensional threshold relative to the vehicle, wherein the means for detecting is positioned adjacent the path on which the vehicles travel and the means for detecting is operable to obtain a plurality of depth data points, wherein each depth data point is indicative of the distance from the means for detecting to the vehicle and/or, its contents wherein the depth data points can be used to create a three-dimensional rendering of a target area that may include the vehicle and the contents that it carries; and
a track that guides the vehicles, wherein the destination areas are disposed on either side of the track and wherein the track comprises a front track and an opposing rear track with an aisle between the front track and the rear track; and
wherein the means for controlling controls operation of the vehicle in response to the means for detecting determining that an item projects beyond the dimensional threshold.

9. The system of claim 8 wherein a picking station is positioned at the end of the aisle, and the means for detecting is positioned between the front track and the rear track.

10. The system of claim 9 wherein the means for detecting is positioned adjacent the picking station so that the target area is a location in the picking area where the vehicles are stopped.

11. A method for handling materials to store items in a plurality of destination areas and/or retrieve items from the plurality of destination areas, wherein the method comprises the steps of:
controlling movement of a plurality of vehicles along a path to deliver items to the destination areas or retrieve items from the destination areas;
detecting whether an item on one of the vehicles extends beyond a pre-determined dimensional threshold relative to the vehicle, wherein the step of detecting comprises obtaining a plurality of depth data points, wherein each depth data point is indicative of the distance from the means for detecting to the vehicle or from the means for detecting to the contents on the vehicle;
wherein the step of controlling movement comprises controlling the vehicles in response to detecting that an item projects beyond the dimensional threshold.

12. The method of claim 11 comprising the step of using the depth data points to create a three-dimensional rendering of a target area that may include the vehicle and the contents that it carries.

13. The method of claim 11 wherein the dimensional threshold is the height above the vehicle or contents on the vehicle.

14. The method of claim 11 wherein in response to detecting that an item projects beyond the dimensional threshold, the step of controlling comprises stopping the vehicle along the path until the item no longer projects beyond the dimensional threshold.

15. The method of claim 11 wherein the step of detecting comprises identifying three reference points that identify a plane generally parallel with an upper surface of the vehicle.

16. The method of claim 15 wherein the step of detecting comprises using the identified plane to identify depth data representative of items that extend above the pre-determined height.

* * * * *